US012101613B2

(12) United States Patent
Ekstrand et al.

(10) Patent No.: US 12,101,613 B2
(45) Date of Patent: Sep. 24, 2024

(54) BASS ENHANCEMENT FOR LOUDSPEAKERS

(71) Applicants: Dolby International AB, Amsterdam (NL); Dolby Laboratories Licensing Corporation, San Francisco, CA (US)

(72) Inventors: Per Ekstrand, Saltsjöbaden (SE); Yuxing Hao, Beijing (CN); Xuemei Yu, Beijing (CN)

(73) Assignees: Dolby International AB, Dublin (IE); Dolby Laboratories Licensing Corporation, San Francisco, CA (US)

( * ) Notice: Subject to any disclaimer, the term of this patent is extended or adjusted under 35 U.S.C. 154(b) by 107 days.

(21) Appl. No.: 17/913,156

(22) PCT Filed: Mar. 19, 2021

(86) PCT No.: PCT/US2021/023239
§ 371 (c)(1),
(2) Date: Sep. 21, 2022

(87) PCT Pub. No.: WO2021/188953
PCT Pub. Date: Sep. 23, 2021

(65) Prior Publication Data

US 2023/0217166 A1 Jul. 6, 2023

Related U.S. Application Data

(60) Provisional application No. 63/010,390, filed on Apr. 15, 2020.

(30) Foreign Application Priority Data

Mar. 20, 2020 (WO) ................ PCT/CN2020/080460

(51) Int. Cl.
*H04R 3/04* (2006.01)

(52) U.S. Cl.
CPC ........... *H04R 3/04* (2013.01); *H04R 2430/01* (2013.01); *H04R 2430/03* (2013.01)

(58) Field of Classification Search
CPC ... H04R 3/04; H04R 2430/01; H04R 2430/03
See application file for complete search history.

(56) References Cited

U.S. PATENT DOCUMENTS 5,930,373 A 7/1999 Shashoua
8,842,845 B2 9/2014 Christoph
(Continued)

FOREIGN PATENT DOCUMENTS

AT E551691 T1 4/2012
CN 102354500 A 2/2012
(Continued)

OTHER PUBLICATIONS

Every, Mark Robert "Separation of Musical Sources and Structure from Single-Channel Polyphonic Recordings" Feb. 2006, IEEE Technical Literature Search.
(Continued)

*Primary Examiner* — Andrew Sniezek

(57) ABSTRACT

A method of audio processing includes generating harmonics in a hybrid complex quadrature mirror filter domain. Generating the harmonics may include multiplication, using a feedback delay loop, and dynamic compression. The harmonics may be generated based on one or more hybrid sub-bands of the complex transform domain signal.

18 Claims, 12 Drawing Sheets

(56) References Cited

U.S. PATENT DOCUMENTS

| | | | | |
|---|---|---|---|---|
| 9,148,126 | B2 | 9/2015 | Christoph | |
| 9,407,993 | B2 | 8/2016 | Ekstrand | |
| 9,418,643 | B2 | 8/2016 | Eronen | |
| 9,536,530 | B2 | 1/2017 | Schnell | |
| 9,542,955 | B2 | 1/2017 | Atti | |
| 9,578,415 | B1 | 2/2017 | Zhou | |
| 9,583,110 | B2 | 2/2017 | Fuchs | |
| 2007/0140511 | A1 | 6/2007 | Yan | |
| 2012/0008788 | A1* | 1/2012 | Jonsson | H04R 3/04 381/17 |
| 2015/0302859 | A1 | 10/2015 | Aguilar | |
| 2015/0312676 | A1 | 10/2015 | Ekstrand | |
| 2018/0014125 | A1 | 1/2018 | You | |
| 2019/0237096 | A1 | 8/2019 | Trella | |
| 2019/0259405 | A1 | 8/2019 | Lohwasser | |

FOREIGN PATENT DOCUMENTS

| | | | |
|---|---|---|---|
| CN | 104704855 | B | 6/2015 |
| CN | 109996151 | A | 7/2019 |
| EP | 0972426 | B1 | 1/2000 |
| EP | 2720477 | B1 | 4/2014 |
| JP | 2008191659 | A | 8/2008 |
| JP | 2008537174 | A | 9/2008 |
| JP | 2009223210 | A | 10/2009 |
| JP | 2015531575 | A | 11/2015 |
| JP | 2018506078 | A | 3/2018 |
| KR | 1020010005972 | U | 1/2001 |
| KR | 20120137313 | A | 12/2012 |
| KR | 101576318 | B1 | 12/2015 |
| WO | 2006110990 | A1 | 10/2006 |
| WO | 2015199954 | A1 | 12/2015 |
| WO | 2015200859 | A1 | 12/2015 |
| WO | 2019021276 | A1 | 1/2019 |

OTHER PUBLICATIONS

McLeod, Philip “Fast, Accurate Pitch Detection Tools for Music Analysis” a thesis submitted for the degree of Doctor of Philosophy, May 30, 2008, pp. 1-190.

* cited by examiner

600

900a

900b

900c

900d

BASS ENHANCEMENT FOR LOUDSPEAKERS

CROSS REFERENCE TO RELATED APPLICATIONS

This application claims priority to International Application No. PCT/CN2020/080460 filed Mar. 20, 2020; and U.S. Provisional Application No. 63/010,390 filed Apr. 15, 2020; all of which are incorporated herein by reference.

FIELD

The present disclosure relates to audio processing, and in particular, to bass enhancement.

BACKGROUND

Unless otherwise indicated herein, the approaches described in this section are not prior art to the claims in this application and are not admitted to be prior art by inclusion in this section.

Bass effect is a desirable user experience and user evaluation indicator for mobile devices such as mobile telephones, media players, tablet computers, laptop computers, headsets, earbuds, etc. Due to the physical constraints of the transducers in mobile devices (e.g., diaphragm size, magnet weight, etc.) it is challenging for the loudspeaker of the mobile device to fully reproduce the acoustics of the original bass sound. As a result, mobile devices often implement audio processing techniques (e.g., using software processes, etc.) to improve the bass sound. These bass enhancement processes may be broadly referred to as "virtual bass" techniques.

SUMMARY

One issue with existing bass enhancement systems is that they may have a high computational complexity. Given the above, there may be a need to implement bass enhancement with reduced computational complexity.

As discussed in more detail herein, embodiments discuss techniques for bass enhancement based on the principle of the "missing fundamental". This principle states in a psychoacoustics way that if a human listens to harmonics of a low frequency signal rather than the low frequency signal (fundamental) itself, the listener's brain is able to extrapolate and hence perceive the absent low frequency signal. Hence, for loudspeakers that are physically inadequate to reproduce low frequency signals (bass), a way to psycho-acoustically improve the quality is to generate harmonics to the low frequency range to enhance the bass effect.

The bass enhancement technique disclosed in this specification is less computationally complex as compared to conventional virtual bass technologies but reaches a similar effect. Hence, embodiments save computational complexity. In addition, the reduced complexity allows for lower latency. The technique may also include loudness adjustment schemes to adjust the power of the generated harmonics, which causes the perception of the resulting loudness to be more realistic and the bass effect to be more compelling.

The techniques disclosed in this specification may be used to enhance the output from mid-sized speakers and smaller transducers, e.g. mobile phone loudspeakers, wireless loudspeakers, etc.

According to an embodiment, a computer-implemented method of audio processing includes receiving a first transform domain signal. The first transform domain signal is a hybrid complex transform domain signal having a plurality of bands. At least one of the plurality of bands has a plurality of sub bands, and the first transform domain signal has a first plurality of harmonics.

The method further includes generating a second transform domain signal based on the first transform domain signal. The second transform domain signal is generated by generating harmonics to the first transform domain signal according to a non-linear process. The second transform domain signal has a second plurality of harmonics that differs from the first plurality of harmonics. The second transform domain signal is further generated by performing loudness expansion on the second plurality of harmonics. The second transform domain signal is a complex-valued signal having an imaginary part.

The method further includes generating a third transform domain signal by filtering the second transform domain signal. The third transform domain signal has a plurality of bands, and at least one of the plurality of bands has a plurality of sub-bands. The method further includes generating a fourth transform domain signal by mixing the third transform domain signal with a delayed version of the first transform domain signal, where a given sub-band of the third transform domain signal is mixed with a corresponding sub-band of the delayed version of the first transform domain signal.

According to another embodiment, an apparatus includes a loudspeaker and a processor. The processor is configured to control the apparatus to implement one or more of the methods described herein. The apparatus may additionally include similar details to those of one or more of the methods described herein.

According to another embodiment, a non-transitory computer readable medium stores a computer program that, when executed by a processor, controls an apparatus to execute processing including one or more of the methods described herein.

The following detailed description and accompanying drawings provide a further understanding of the nature and advantages of various implementations.

DETAILED DESCRIPTION

Described herein are techniques related to bass enhancement. In the following description, for purposes of explanation, numerous examples and specific details are set forth in order to provide a thorough understanding of the present disclosure. It will be evident, however, to one skilled in the art that the present disclosure as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

This document describes various processing functions that are associated with structures such as blocks, elements, components, circuits, etc. In general, these structures may be implemented by a processor that is controlled by one or more computer programs.

Figure 1:
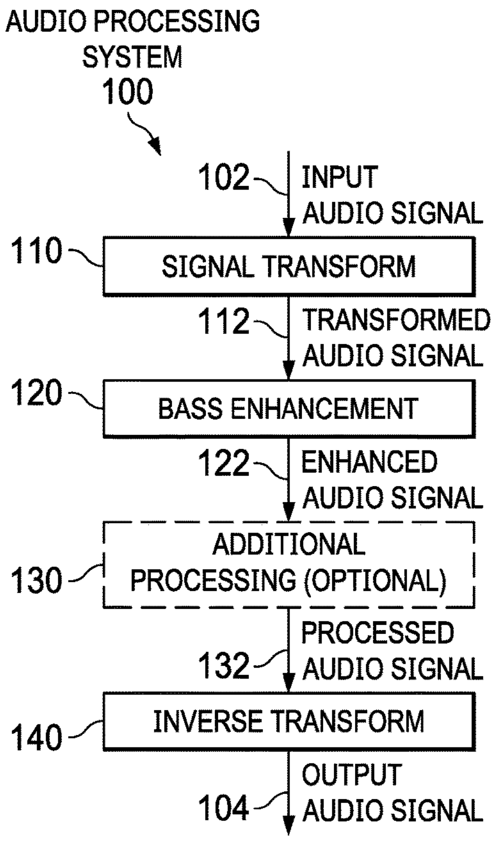
FIG. 1 is a block diagram of an audio processing system 100.

FIG. 1 is a block diagram of an audio processing system 100. The audio processing system 100 generally receives an input audio signal 102, processes the input audio signal 102 according to the bass enhancement processes described herein, and generates an output audio signal 104. The audio processing system 100 includes a signal transform system 110, a bass enhancement system 120, an additional processing system 130 (optional), and an inverse signal transform system 140. The audio processing system 100 may include other components that (for brevity) are not discussed in detail. The components of the audio processing system 100 may be implemented by one or more computer programs that are executed by a processor.

The signal transform system 110 receives the input audio signal 102, performs a signal transform process, and generates a transformed audio signal 112. The input audio signal 102 may be a digital time domain signal that includes a number of samples that correspond to audio (e.g., sound in waveform pulse-code modulation (PCM) format). The input audio signal 102 may have a sample rate of 32 kHz, 44.1 kHz, 48 kHz, 192 kHz, etc. The input audio signal 102 may originate from a variety of formats, including the Advanced Television Systems Committee (ATSC) Digital Audio Compression (AC-3, E-AC-3) Standard. As a specific example, the input audio signal 102 may originate from a Dolby Digital Plus™ signal with a sample rate of 48 kHz.

The signal transform system 110 may perform a variety of signal transform processes. In general, the signal transform process transforms the input audio signal 102 from a first signal domain to a second signal domain. For example, the first domain may be the time domain, and the second signal domain may be the frequency domain, the quadrature mirror frequency (QMF) domain, the complex quadrature mirror frequency (CQMF) domain, the hybrid complex quadrature mirror frequency (HCQMF) domain, etc. The transform from the first signal domain to the second signal domain may also be referred to as "analysis", e.g. transform analysis, signal analysis, filter bank analysis, QMF analysis, CQMF analysis, HCQMF analysis, etc.

In general, QMF domain information is generated by a filter whose frequency response is the mirror image around $\pi/2$ of that of another filter; together these filters are known as a QMF pair. QMF theory also comprises filter banks with more channels than two (e.g., 64 channels); these may be referred to as M-channel QMF banks. QMF theory further teaches M-channel Pseudo QMF banks of the class referred to as modulated filter banks. In general, "CQMF" domain information results from a complex-modulated discrete Fourier transform (DFT) filter bank applied to a time-domain signal. The CQMF is a "complex" signal because it includes complex valued signals, e.g. signals that include an imaginary part in addition to the real part. In general, "HCQMF" domain information corresponds to CQMF domain information in which the CQMF filter bank has been extended to a hybrid structure to obtain an efficient non-uniform frequency resolution that better matches the frequency resolution of the human auditory system. In general, the term "hybrid" refers to a structure in which at least one frequency band is split into sub-bands.

According to a specific HCQMF implementation, the HCQMF information is generated into 77 frequency bands, where the lower CQMF bands are further split into sub-bands in order to obtain a higher frequency resolution for the lower frequencies. According to a further specific implementation, the signal transform system 110 transforms each channel of the input audio signal 102 into 64 CQMF bands, and further divides the lowest 3 bands into sub-bands as follows: the first band is divided into 8 sub-bands, and the second and third bands are each divided into 4 sub-bands. (This hybrid splitting of the lowest bands into sub-bands is to improve the low-frequency resolution of these bands.) The signal transform system 110 may include Nyquist filters to split the bands into sub-bands. The 77 HCQMF bands then correspond to the 61 highest CQMF bands, plus the 16 sub-bands (8+4+4) from the lowest 3 CQMF bands. The sub-bands and bands may be numbered from 0 to 76, with the lowest frequency sub-band being number 0. The other sub-bands are then numbered from 1 to 15, and the remaining bands are numbered from 16 to 76. These 77 HCQMF bands may then be referred to as "hybrid bands" or "channels" along with their number, e.g., hybrid band 0, hybrid band 1, hybrid band 76, channel 0, channel 1, channel 76, etc. The hybrid bands 0-15 may also be referred to as "sub-bands" along with their number, e.g., sub-band 0, sub-band 1, sub-band 15, etc. The hybrid bands 16-76 may also be referred to as "bands" along with their number, e.g., band 16, band 17, band 76, etc. The channels 1 and 3 may have passbands on the negative frequency axis, but generally the other channels do not.

(Note that the terms QMF, CQMF and HCQMF are used a bit colloquially herein. Specifically, the terms QMF/CQMF may be used colloquially to refer to a DFT filter bank that may include more than two bands. The term HCQMF may be used colloquially to refer to a non-uniform DFT filter bank that may include more than two bands.)

As a specific example, the signal transform system 110 performs a HCQMF transform on the input audio signal 102 to generate the transformed audio signal 112 having 77 frequency bands. In this case, the signal domain of the transformed audio signal 112 may be referred to as the HCQMF domain or the hybrid domain, and the HCQMF transform may be referred to as HCQMF analysis.

The bandwidth and the sampling frequency of the bands will depend upon the sampling frequency of the input audio signal 102. For example, when the input audio signal 102 has a sampling frequency of 48 kHz (corresponding to a maximum bandwidth of 24 kHz), the hybrid structure with 77 bands discussed above results in a sampling frequency of 750 Hz for all bands. The 61 bands with the highest frequencies have a passband bandwidth of 375 Hz; the 8 lowest-frequency sub-bands have a passband bandwidth of 93.75 Hz; and the next-lowest-frequency sub-bands have a passband bandwidth of 187.5 Hz.

The bass enhancement system 120 receives the transformed audio signal 112, performs bass enhancement, and generates an enhanced audio signal 122. In general, the bass enhancement system 120 generates harmonics to the transformed audio signal 112 in order for the listener to psychoacoustically perceive the missing fundamental. Further details of the bass enhancement system 120 are provided below (e.g., with reference to FIG. 2, etc.).

The additional processing system 130 is optional. When present, the additional processing system 130 receives the enhanced audio signal 122, performs additional signal processing, and generates a processed audio signal 132. Alternatively, the additional processing system 130 may operate on the transformed audio signal 112 prior to the operation of the bass enhancement system 120, in which case the bass enhancement system 120 receives as its input the signal output from the additional processing system 130 (instead of receiving the output signal directly from the signal transform system 110). As another option, the additional processing system 130 may be multiple additional processing systems that operate both before and after the bass enhancement system 120. The specific arrangement of the additional processing system 130 within the audio processing system 100 may vary according to the specific types of additional processing that the additional processing system 130 performs.

In general, the additional processing system 130 performs additional processing of the input audio signal 102 in the transform domain. This allows the bass enhancement system 120 to operate in combination with existing audio processing techniques that are implemented in the transform domain. Examples of the additional processing include dialogue enhancement, intelligent equalization, volume leveling, spectral limiting, etc. Dialogue enhancement refers to enhancing speech signals (e.g., as compared to sound effects), in order to improve the intelligibility of the speech. Intelligent equalization refers to performing dynamic adjustment of the audio tone, e.g. to provide consistency of spectral balance (also known as “tone” or “timbre”). Volume leveling refers to increasing the volume of quiet audio and decreasing the volume of loud audio, e.g. to reduce the need for a listener to perform manual adjustment of the volume. Spectral limiting refers to limiting selected frequencies or frequency bands, e.g. to limit the lowest frequencies that are difficult to output from small loudspeakers.

The inverse signal transform system 140 receives the enhanced audio signal 122 (or optionally the processed audio signal 132), performs an inverse transform, and generates the output audio signal 104. The inverse transform generally converts a signal from the second signal domain back into the first signal domain. In general, the inverse transform is an inverse of the signal transform process performed by the signal transform system 110. For example, when the signal transform system 110 performs a HCQMF transform, the inverse signal transform system 140 performs an inverse HCQMF transform. The transform from the second signal domain back to the first signal domain may also be referred to as “synthesis”, e.g. transform synthesis, signal synthesis, filter bank synthesis, etc.; and the inverse HCQMF transform may be referred to as HCQMF synthesis.

In this manner, the output audio signal 104 corresponds to the input audio signal 102, with the addition of the bass enhancement and/or additional signal enhancements. The output audio signal 104 may then be output by a loudspeaker and perceived as sound by the listener.

As discussed above and in more detail below, the bass enhancement system 120 is suitable for small to mid-sized speakers. The processes implemented by the bass enhancement system 120 may be simpler than many existing bass enhancement methods; as compared to these existing methods, the bass enhancement system 120 has lower computational complexity and allows for short latency, while still retaining the audio quality. The bass enhancement system 120 is well suited for mid-sized speakers in e.g. TV sets or wireless speakers, and is also efficient for bass improvement of small transducers, e.g. for mobile phones, laptops and tablets. The bass enhancement system 120 in one mode of operation not only adds harmonics to the mix, but also adds the (dynamically changed) original bass, i.e. it may be operated to have an inherent bass boost.

Figure 2:
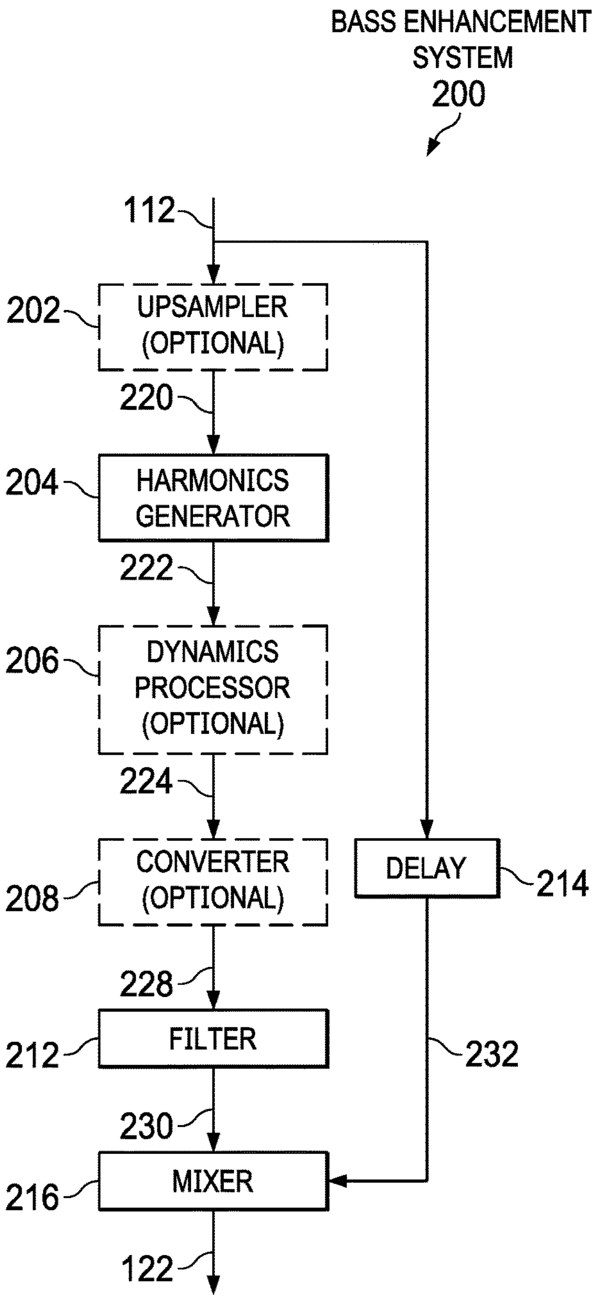
FIG. 2 is a block diagram of a bass enhancement system 200.

FIG. 2 is a block diagram of a bass enhancement system 200. The bass enhancement system 200 may be used as the bass enhancement system 120 (see FIG. 1). For brevity, the description of FIG. 2 focuses on a single signal processing path in order to describe the general operation of bass enhancement system 200; additional signal processing paths may also be implemented in variations of the bass enhancement systems described herein (see, e.g., FIG. 10). The additional signal processing paths will also be briefly described here.

The bass enhancement system 200 receives the transformed audio signal 112 (see FIG. 1). As discussed above, the transformed audio signal 112 is a hybrid complex transform domain signal (e.g., a HCQMF domain signal) with a number of bands (e.g., 77 hybrid bands, with the 3 lowest-frequency bands split into sub-bands). As a complex signal, the transformed audio signal 112 has complex values, e.g. both real values and imaginary values. Each sub-band may be processed in its own processing path, so the following description focuses on processing one sub-band (e.g., one of sub-bands 0, 2, 4, 6, etc.). The bass enhancement system 200 includes an upsampler (optional) 202, a harmonics generator 204, a dynamics processor 206 (optional), a converter 208 (optional), a filter 212, a delay 214, and a mixer 216.

The upsampler 202 receives the transformed audio signal 112, performs upsampling, and generates an upsampled signal 220. As an example, when the input audio signal 102 (see FIG. 1) has a sampling frequency of 48 kHz, and the transformed audio signal 112 is processed into 64 bands, each band has a sampling frequency of 750 Hz. The upsampler 202 may upsample the selected sub-band of the transformed audio signal 112 by 2×, 3×, 4×, 5×, 6×, etc. A suitable amount of upsampling is 4×, e.g. so that the upsampled signal 220 has a sampling frequency of 3 kHz when the selected sub-band of the transformed audio signal 112 has a sampling frequency of 750 Hz. The upsampled signal 220 is a complex transform domain signal. The upsampled signal 220 has a bandwidth that corresponds to the bandwidth of the selected sub-band of the transformed audio signal 112. As an example, when the selected sub-band 0 having a passband bandwidth of 93.75 Hz is input to the upsampler, the upsampled signal 220 likewise has a bandwidth of 93.75 Hz.

The upsampler 202 may be implemented by performing CQMF synthesis. As an example, to upsample sub-band 0 from 750 Hz to 3000 Hz (4× upsampling), the upsampler may implement 4-channel CQMF synthesis, with one input being the sub-band 0 and the other 3 inputs being zero (null). The synthesis is configured as to maintain the signal 220 being a complex-valued time domain signal.

The upsampler 202 is optional. In general, the upsampler 202 provides additional headroom when generating the harmonics (see the harmonics generator 204), to allow bandwidth extension without aliasing (also referred to as spectral folding). The upsampler 202 may be omitted when processing one or more of the lowest frequency sub-bands. For example, when processing the lowest band (e.g., sub-band 0) only, the upsampler 202 may be omitted, as up to (at least) $6^{th}$ order harmonics may be generated without folding. Processing the lowest two bands (e.g., sub-bands 0 and 2), the upsampler 202 may be omitted if only $2^{nd}$ and $3^{rd}$ order harmonics are generated. Processing the lowest three bands (e.g., sub-bands 0, 2 and 4), only $2^{nd}$ order harmonics may be generated without aliasing. This is discussed in more detail with reference to the harmonics generator 204.

The harmonics generator 204 receives the upsampled signal 220 (or the selected sub-band signal of the transformed audio signal 112 when the upsampler 202 is omitted) and generates harmonics thereof to result in a signal 222. As mentioned with reference to the upsampler 202, the harmonics generator 204 extends the bandwidth of its input signal when generating the harmonics for the signal 222. For example, when sub-band 0 covers 0 to 93.75 Hz, the sampling frequency of 750 Hz may be sufficient to avoid aliasing of the generated harmonics. Similarly, when sub-band 2 covers 93.75 to 187.5 Hz, the sampling frequency of 750 Hz may be sufficient to avoid aliasing of the generated harmonics. However, when sub-band 4 covers 187.5 to 281.25 Hz, the harmonics are approaching the Nyquist frequency of the original signal (with the sampling frequency of 750 Hz), so upsampling is recommended for sub-bands 4, 6, etc. The signal 222 is a complex transform domain signal. The signal 222 has a bandwidth that is greater than the bandwidth of the input to the harmonics generator 204, due to the addition of the harmonic frequencies. For example, when the upsampled signal 220 has a bandwidth of 93.75 Hz, the signal 222 may have a bandwidth that exceeds 300 Hz.

The harmonics generator 204 uses a non-linear process to generate the harmonics. In general, a non-linear process applies different gains to different components of the signal. Examples of the non-linear processes include multiplication, a feedback delay loop, rectification, etc. as further detailed below with reference to FIGS. 3, 4, 5 and 8.

The harmonics generator 204 may also perform loudness expansion when generating the signal 222. Because the sound pressure level for a fixed loudness range (in phon) is increasing with frequency in the bass/mid range (e.g., less than 800 Hz), the harmonics generator 204 performs expansion in dynamics when generating the signal 222. Examples of loudness expansion processes include dynamic compression and loudness correction. Further details of the loudness expansion are provided with reference to FIG. 6 below.

The dynamics processor 206 receives the signal 222, performs dynamics processing, and generates a signal 224. The signal 224 is a complex transform domain signal. In general, the dynamics processor 206 implements dynamics processing by performing compression on the signal 222, in order to control the transient to tonal ratio of the signal 224. The dynamics processor 206 may implement an attack time that is relatively longer (e.g., between 4× to 12× longer, such as 8× longer) than the release time. For example, the attack time may be between 140 and 180 ms (e.g., 160 ms) and the release time may be between 15 and 25 ms (e.g., 20 ms). The dynamics processor 206 may implement de-coupled smooth peak detection using feed-forward topology. The dynamics processor 206 may implement compression similar to the compression performed by the harmonics generator (described in more detail with reference to FIGS. 3, 4 and 5).

The dynamics processor 206 is optional. When the dynamics processor 206 is omitted, the converter 208 receives the signal 222 instead of the signal 224.

The converter 208 receives the signal 224 (or the signal 222 when the dynamics processor 206 is omitted), drops the imaginary part from the signal 224, and generates a signal 228. In general, dropping the imaginary part lowers the computational complexity of subsequent analysis filter banks (e.g., the filter 212), due to processing real-valued signals instead of complex-valued signals. As discussed above, the signal 224 is a complex transform domain signal that has complex values, e.g. both real values and imaginary values. The converter 208 may drop the imaginary part of the signal 224 by taking the real part of the complex-valued signal. The signal 228 is a real-valued transform domain signal.

The converter 208 is optional and may be omitted in some embodiments of the bass enhancement system 200. When the upsampler 202 is omitted, the converter 208 should also be omitted, in order for the imaginary part to remain in the signal processing path for use by subsequent components.

The filter 212 receives the signal 228 (or the signal 224 when the converter 208 is omitted, or the signal 222 when the dynamics processor 206 and the converter 208 are omitted), performs filtering of the input, and generates a signal 230. The signal 230 is a complex-valued transform domain signal. The filtering generally splits the signal 228 into sub-bands as one of the inputs to the mixer 216. The specifics of the filtering will depend upon whether or not upsampling was performed (see the upsampler 202).

When the upsampler 202 is not present, the filter 212 may be implemented by feeding the input signal (e.g., the signal 228) into an 8-channel Nyquist filter bank to generate the signal 230 that has hybrid sub-bands 0-7.

When the upsampler 202 is present, the filter 212 may be implemented by a CQMF analysis filter bank and two or more Nyquist filters. The real part of the input signal (e.g., the signal 228) is fed into the CQMF analysis filter bank; the CQMF analysis filter bank has an appropriate number of channels to generate the signal 230 having sub-band signals of 750 Hz sampling frequency. The appropriate number of channels then depends on the upsampling performed. For example, when 4× upsampling is performed, and hence a 4 channel CQMF analysis bank is used in the filter 212, the three lowest frequency CQMF sub-band signals are each fed into a corresponding Nyquist filter (one generating hybrid sub-bands 0-7, one generating hybrid sub-bands 8-11, and one generating hybrid sub-bands 12-15). As another example, when 2× upsampling is performed, and hence a 2 channel CQMF analysis bank is used in the filter 212, the two CQMF sub-band signals are each fed into a corresponding Nyquist filter (one generating hybrid sub-bands 0-7, and one generating hybrid sub-bands 8-11). The remaining CQMF channels, if any, are provided to the mixer 216 (with an appropriate delay corresponding to the delay of the Nyquist filters).

The filter 212 may be implemented with filters similar to those used by the signal transform system 110 (see FIG. 1). For example, a first Nyquist analysis filter with 8 channels may generate the sub-bands 0-7, a second Nyquist analysis filter with 4 channels may generate the sub-bands 8-11, and a third Nyquist analysis filter with 4 channels may generate the sub-bands 12-15.

The delay 214 receives the transformed audio signal 112, implements a delay period, and generates a signal 232. The signal 232 corresponds to a delayed version of the transformed audio signal 112 according to the delay period. The delay 214 may be implemented using a memory, a shift register, etc. The delay period corresponds to the processing time of the other components in the signal processing chain, e.g. the upsampler 202, the harmonics generator 204, the dynamics processor 206, the converter 208, the filter 212, etc. Because some of these other components are optional, the delay period decreases as more of the optional components are omitted. In one example, the delay period is 961 samples, of which 577 correspond to the upsampling, and 384 correspond to the remaining components, e.g. the Nyquist filters. As another example, the delay period is 384 samples when the upsampler 202 is omitted.

The mixer 216 receives the signal 230 and the signal 232, performs mixing, and generates the enhanced audio signal 122 (see FIG. 1). The enhanced audio signal 122 is a transform domain signal. The mixer 216 mixes the signals on a per-band basis. For example, the signal 230 and the signal 232 may each have 77 hybrid bands (e.g., 8+4+4+61 HCQMF bands), and the mixer 216 mixes sub-band 0 of the signal 230 with sub-band 0 of the signal 232, mixes sub-band 1 of the signal 230 with sub-band 1 of the signal 232, etc. The mixer 216 need not mix all the bands; one or more of the bands of the signal 232 may be passed through when generating the enhanced audio signal 122. For example, the highest frequency bands (e.g., one or more of the hybrid bands 16-77) of the signal 232 may be passed through without mixing.

Further details of the bass enhancement system 200 are provided below. First, various options for the harmonics generator 204 are discussed, with reference to FIGS. 3-5.

Figure 3:
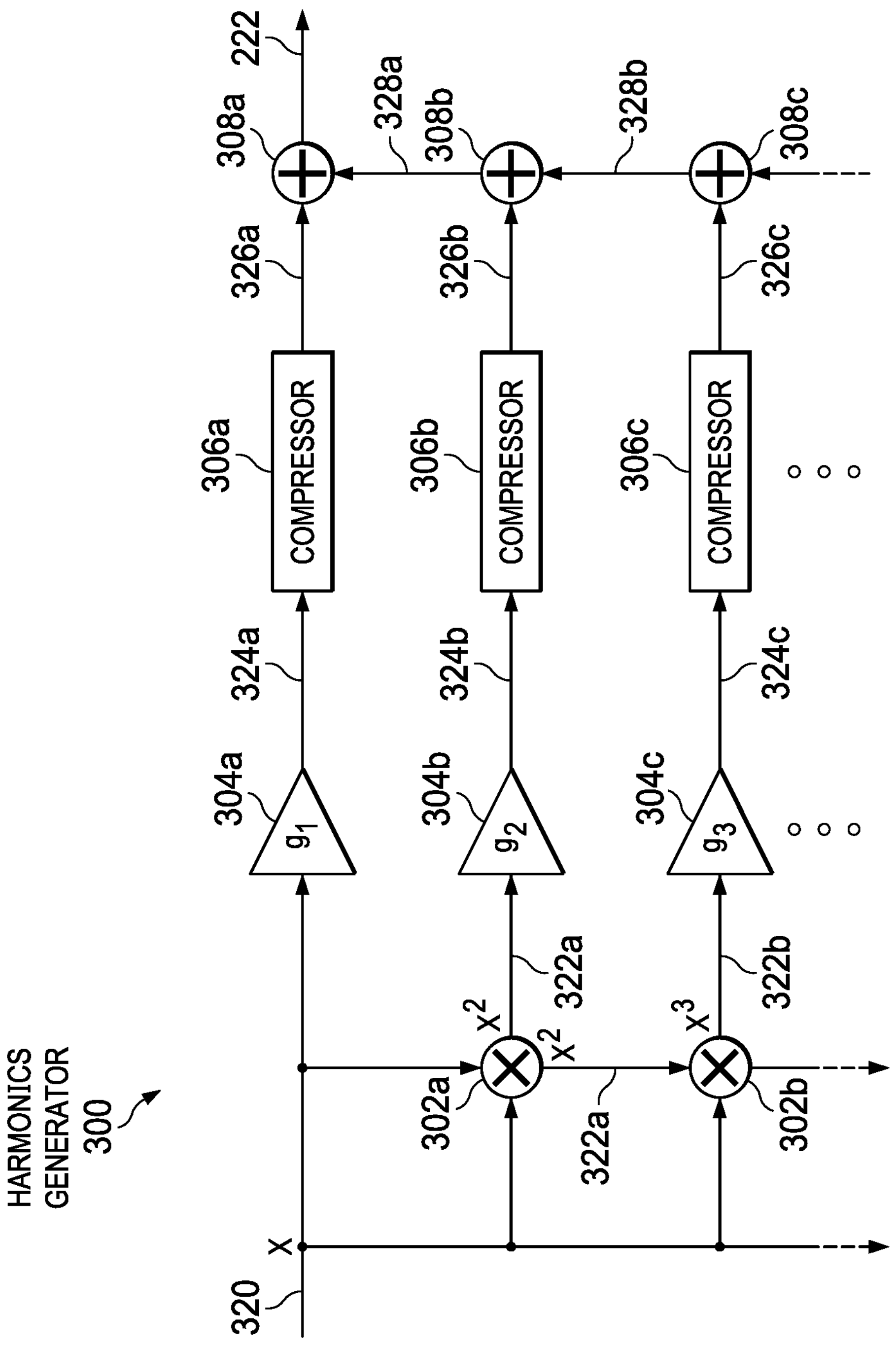
FIG. 3 is a block diagram of a harmonics generator 300.

FIG. 3 is a block diagram of a harmonics generator 300. The harmonics generator 300 may be used as the harmonics generator 204 (see FIG. 2). In general, the harmonics generator 300 generates each consecutive harmonic by multiplication (e.g., using direct signal multiplication) of the input signal and the preceding harmonics.

The harmonics generator 300 includes one or more multipliers 302 (two shown: 302*a* and 302*b*), two or more gain stages 304 (three shown: 304*a*, 304*b* and 304*c*), two or more compressors 306 (three shown: 306*a*, 306*b* and 306*c*), and two or more adders 308 (three shown: 308*a*, 308*b* and 308*c*). In general, each row of components in the harmonics generator 300 corresponds to one of the generated harmonics, so the number of rows (and the corresponding number of components) may be adjusted to implement the desired number of harmonics. The first processing row includes the gain stage 304*a*, the compressor 306*a*, and the adder 308*a*. The second processing row includes the multiplier 302*a*, the gain stage 304*b*, the compressor 306*b*, and the adder 308*b*. The third processing row includes the multiplier 302*b*, the gain stage 304*c*, the compressor 306*c*, and the adder 308*c*. Additional rows may be added to generate additional harmonics, with each new row connected to the previous row in a manner similar to what is shown in the figure.

The harmonics generator 300 receives an input signal 320, also denoted as "x". The input signal 320 corresponds to the upsampled signal 220 (see FIG. 2) when the upsampler 202 is present, or to the transformed audio signal 112 when the upsampler 202 is not present. The input signal 320 is a complex transform domain signal. For example, the input signal 320 may correspond to a HCQMF band (e.g., hybrid sub-band 0, hybrid sub-band 2, hybrid sub-band 4, hybrid sub-band 6, etc.). The harmonics generator 300 generates the signal 222 (see FIG. 2).

Starting with the multipliers 302, the multiplier 302*a* receives the input signal 320, performs multiplication of the input signal 320 with itself, and generates a signal 322*a*, also denoted as "$x^2$". The multiplier 302*b* receives the input signal 320 and the signal 322*a*, performs multiplication of the input signal 320 with the signal 322*a*, and generates a signal 322*b*, also denoted as "$x^3$". Note that the output of a given multiplier is provided as an input to the multiplier in the subsequent processing row: The signal 322*a* is provided to the multiplier 302*b*, the signal 322*b* is provided to the multiplier in the subsequent row (shown with a dotted line), etc.

Turning to the gain stages 304, the gain stage 304*a* receives the input signal 320, applies a gain $g_1$, and generates a signal 324*a*. The gain stage 304*b* receives the signal 322*a*, applies a gain $g_2$, and generates a signal 324*b*. The gain stage 304*c* receives the signal 322*b*, applies a gain $g_3$, and generates a signal 324*c*. The gains $g_1$, $g_2$, $g_3$, etc. may be adjusted as desired, generally as a tuning exercise for each specific device that implements the harmonics generator 300. In general, the gain $g_1$ may be much smaller than the other gains (e.g., less than 50% of the other gains). Setting the gain $g_1$ to a small value reduces what is referred to as the direct signal corresponding to the original bass harmonic, which is undesired in small loudspeakers that are physically inadequate to reproduce any signal in the direct signal frequency range. If so desired, the gain $g_1$ may be set to zero to eliminate the direct signal.

Turning to the compressors 306, the compressor 306*a* receives the signal 324*a*, performs dynamic compression, and generates a signal 326*a*. The compressor 306*b* receives the signal 324*b*, performs dynamic compression, and generates a signal 326*b*. The compressor 306*c* receives the signal 324*c*, performs dynamic compression, and generates a signal 326*c*. The dynamic compression generally corresponds to an equation $y^r$, where y corresponds to the input signal (e.g., the signal 324*a*) and r is the compression ratio, where r is less than 1. The compression ratio r may differ for each harmonic (e.g., each row). For example, the compression ratio $r_1$ for the compressor 306*a* may differ from the compression ratio $r_2$ for the compressor 306*b*, which may differ from the compression ratio $r_3$ for the compressor 306*c*, etc. The compression ratios may be adjusted as tuning parameters based on the specific physical characteristics of the device implementing the harmonics generator 300. Further details of the compressors 306 are provided below in the discussion regarding loudness expansion.

Turning to the adders 308, the adder 308*c* receives the signal 326*c* (and any output signal from the adder in any additional row), performs addition, and generates a signal 328*b*. The adder 308*b* receives the signal 326*b* and the signal 328*b*, performs addition, and generates a signal 328*a*. The adder 308*a* receives the signal 326*a* and the signal 328*a*, performs addition, and generates the signal 222 (see FIG. 2). Note that one of the inputs to a given adder is provided by the adder in the subsequent processing row: The adder 308*c* receives the output of the adder in the subsequent processing row (shown with a dotted line), the adder 308*b* receives the output of the adder 308*c*, the adder 308*a* receives the output of the adder 308*b*, etc.

The harmonics generator 300 is processing complex valued signals, e.g. signals with very low contribution from negative frequencies. Hence, when generating harmonics by multiplying the complex-valued signal with itself, a much cleaner output is obtained than if the input signal is real-valued, e.g. it results in less intermodulation distortion. In the complex-valued case, for an input signal consisting of plural frequencies, only the wanted terms plus the terms from frequency sums are generated, but not the terms from frequency differences, as would be the case for real-valued processing. The difference terms are, although usually of low frequencies, more perceptually offensive than the summation terms. The summation terms may actually be desirable, e.g. when the input signal contains a harmonic series.

Figure 4:
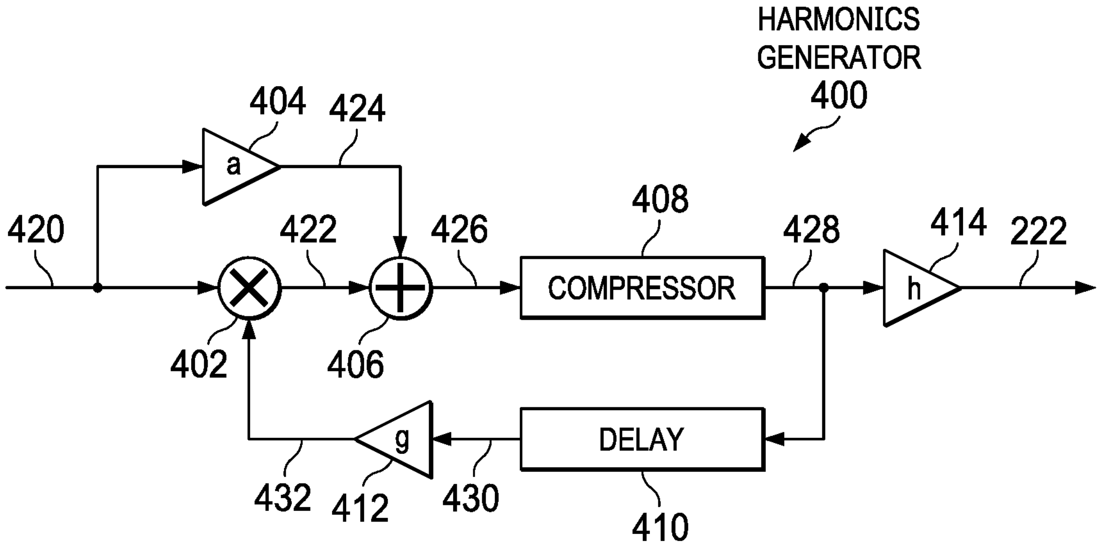
FIG. 4 is a block diagram of a harmonics generator 400.

FIG. 4 is a block diagram of a harmonics generator 400. The harmonics generator 400 may be used as the harmonics generator 204 (see FIG. 2). In general, the harmonics generator 400 generates harmonics by applying a feedback delay loop to the input signal. The harmonics generator 400 includes a multiplier 402, a gain stage 404, an addition stage 406, a compressor 408, a delay stage 410, a gain stage 412, and a gain stage 414.

The harmonics generator 400 receives an input signal 420. The input signal 420 corresponds to the upsampled signal 220 (see FIG. 2) when the upsampler 202 is present, or to the transformed audio signal 112 when the upsampler 202 is not present. The input signal 420 is a complex transform domain signal. For example, the input signal 420 may correspond to a HCQMF band (e.g., hybrid sub-band 0, hybrid sub-band 2, hybrid sub-band 4, hybrid sub-band 6, etc.). The harmonics generator 400 generates the signal 222 (see FIG. 2).

The multiplier 402 receives the input signal 420, multiplies the input signal 420 with a signal 432, and generates a signal 422. The signal 432 may also be referred to as the feedback signal 432, and is discussed in more detail below with reference to the gain stage 412.

The gain stage 404 receives the input signal 420, applies a gain a, and generates a signal 424. The gain a may also be referred to as the blend gain. The value of the gain a may be adjusted as a tuning parameter based on the specific physical characteristics of the device implementing the harmonics generator 400.

The addition stage 406 receives the signal 422 and the signal 424, performs addition, and generates a signal 426. The combination of the gain stage 404 and the addition stage 406, when added to the signal 422, is used to help get the feedback loop started (e.g., when the signal 432 is initially zero) and otherwise helps to keep the feedback loop alive.

The compressor 408 receives the signal 426, performs dynamic compression, and generates a signal 428. The dynamic compression generally corresponds to an equation $y^r$, where y corresponds to the input signal (e.g., the signal 426) and r is the compression ratio, where r is less than 1. The compression ratio may be adjusted as a tuning parameter based on the specific physical characteristics of the device implementing the harmonics generator 400. Further details of the compressor 408 are provided below in the discussion regarding loudness expansion.

The delay stage 410 receives the signal 428, performs a delay operation, and generates a signal 430. The delay stage 410 may be implemented using a memory.

The gain stage 412 receives the signal 430, applies a gain g, and generates the signal 432. The gain g may also be referred to as the feedback gain. As discussed above regarding the multiplier 402, the signal 432 is multiplied with the input signal 420 to generate harmonics of theoretically indefinite order.

The gain stage 414 receives the signal 428, applies a gain h, and generates the signal 222 (see FIG. 2). The gain h may also be referred to as the output gain. The value of the gain h may be adjusted as a tuning parameter based on the specific physical characteristics of the device implementing the harmonics generator 400.

As with the harmonics generator 300, the harmonics generator 400 generates a direct signal corresponding to the original bass harmonic. The direct signal may be reduced, as desired, by adjusting the values of the gain a and the compression ratio r.

As with the harmonics generator 300, the harmonics generator 400 is processing complex valued signals, and when generating harmonics by multiplying the complex-valued signal with itself, a much cleaner output is obtained than if the input signal is real-valued.

Figure 5:
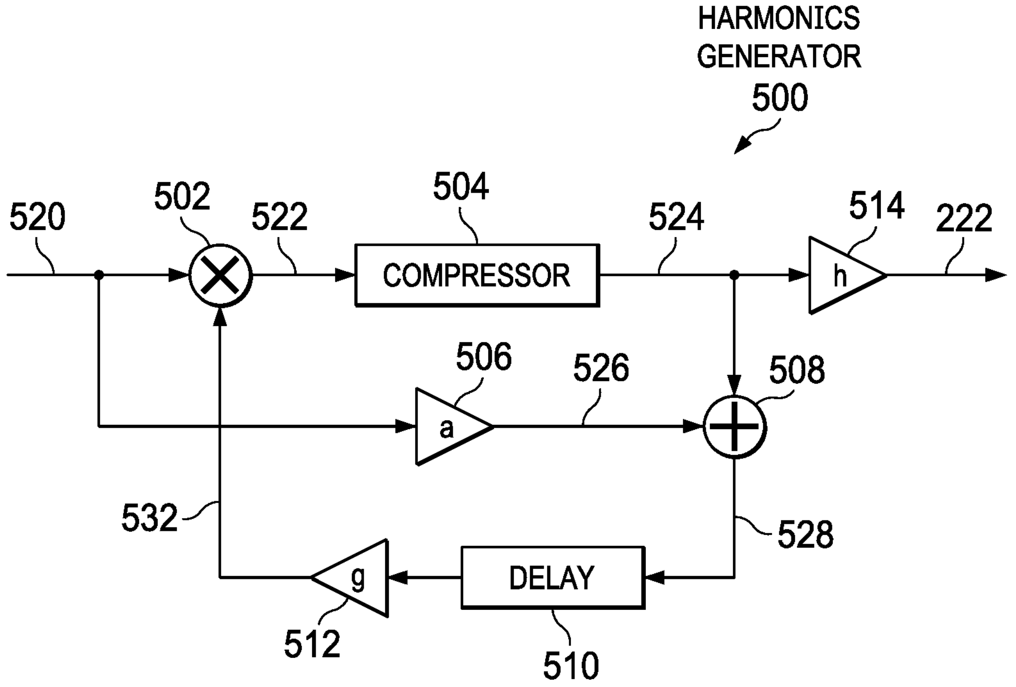
FIG. 5 is a block diagram of a harmonics generator 500.

FIG. 5 is a block diagram of a harmonics generator 500. The harmonics generator 500 may be used as the harmonics generator 204 (see FIG. 2). The harmonics generator 500 is similar to the harmonics generator 400 (see FIG. 4), but with the blend gain signal added after the compressor. The harmonics generator 500 includes a multiplier 502, a compressor 504, a gain stage 506, an addition stage 508, a delay stage 510, a gain stage 512, and a gain stage 514.

The harmonics generator 500 receives an input signal 520. The input signal 520 corresponds to the upsampled signal 220 (see FIG. 2) when the upsampler 202 is present, or to the transformed audio signal 112 when the upsampler 202 is not present. The input signal 520 is a complex transform domain signal. For example, the input signal 520 may correspond to a HCQMF band (e.g., hybrid sub-band 0, hybrid sub-band 2, hybrid sub-band 4, hybrid sub-band 6, etc.). The harmonics generator 500 generates the signal 222 (see FIG. 2).

The multiplier 502 receives the input signal 520, multiplies the input signal 520 with a signal 532, and generates a signal 522. The signal 532 may also be referred to as the feedback signal 532, and is discussed in more detail below with reference to the gain stage 512.

The compressor 504 receives the signal 522, performs dynamic compression, and generates a signal 524. The dynamic compression generally corresponds to an equation $y^r$, where y corresponds to the input signal (e.g., the signal 522) and r is the compression ratio, where r is less than 1. The compression ratio may be adjusted as a tuning parameter based on the specific physical characteristics of the device implementing the harmonics generator 500. Further details of the compressor 504 are provided below in the discussion regarding loudness expansion.

The gain stage 506 receives the input signal 520, applies a gain a, and generates a signal 526. The gain a may also be referred to as the blend gain. The value of the gain a may be adjusted as a tuning parameter based on the specific physical characteristics of the device implementing the harmonics generator 500.

The addition stage 508 receives the signal 524 and the signal 526, performs addition, and generates a signal 528. The combination of the gain stage 506 and the addition stage 508, when added to the signal 524, is used to help get the feedback loop started (e.g., when the signal 532 is initially zero) and otherwise helps to keep the feedback loop alive.

The delay stage 510 receives the signal 528, performs a delay operation, and generates a signal 530. The delay stage 510 may be implemented using a memory.

The gain stage 512 receives the signal 530, applies a gain g, and generates the signal 532. The gain g may also be referred to as the feedback gain. As discussed above regarding the multiplier 502, the signal 532 is multiplied with the input signal 520 to generate harmonics of theoretically indefinite order.

The gain stage 514 receives the signal 524, applies a gain h, and generates the signal 222 (see FIG. 2). The gain h may also be referred to as the output gain. The value of the gain h may be adjusted as a tuning parameter based on the specific physical characteristics of the device implementing the harmonics generator 500.

As compared to the harmonics generator 300 (see FIG. 3) and the harmonics generator 400 (see FIG. 4), the harmonics generator 500 avoids the direct signal path by adding the input signal 520 later in the loop (e.g., as the signal 526). In such an arrangement, the input signal 520 passes through the multiplier 502 (in contrast to the adder 406 in FIG. 4) as part of generating the signal 222, so the signal 222 contains no direct signal.

As with the harmonics generator 300 and the harmonics generator 400, the harmonics generator 500 is processing complex valued signals, and when generating harmonics by multiplying the complex-valued signal with itself, a much cleaner output is obtained than if the input signal is real-valued.

Loudness Expansion

As discussed above, because the sound pressure level for a fixed loudness range (in phon) is increasing with frequency in the bass/mid range (e.g., less than 800 Hz), the harmonics generators (e.g., the harmonics generator 204 of FIG. 2, the harmonics generator 300 of FIG. 3, the harmonics generator 400 of FIG. 4, the harmonics generator 500 of FIG. 5, etc.) perform expansion in dynamics when generating their output signals. The harmonics generators may use compressors (e.g., the compressors 306 of FIG. 3, the compressor 408 of FIG. 4, the compressor 504 of FIG. 5, etc.) when performing loudness expansion. Examples of loudness expansion processes include dynamic compression and loudness correction.

Dynamic Compression

The harmonics generators may generate $n^{th}$ order harmonics using an operation corresponding to Equation (1):

$$y_n = x^n = |x|^n \cdot e^{jn\varphi} \tag{1}$$

In Equation (1), n is the order of harmonic, y is the output signal, x is the input signal, $e^{jn\varphi}$ is a complex exponential function, j is an imaginary number, and φ is the phase. The output signal is generated by multiplying the input signal by itself n times. Accordingly, increasing n increases the order of the generated harmonic. (The right-hand side of Equation (1) serves later herein as illustration why dynamic expansion ultimately results in dynamic compression when signals have been multiplied with themselves.)

Figure 6:
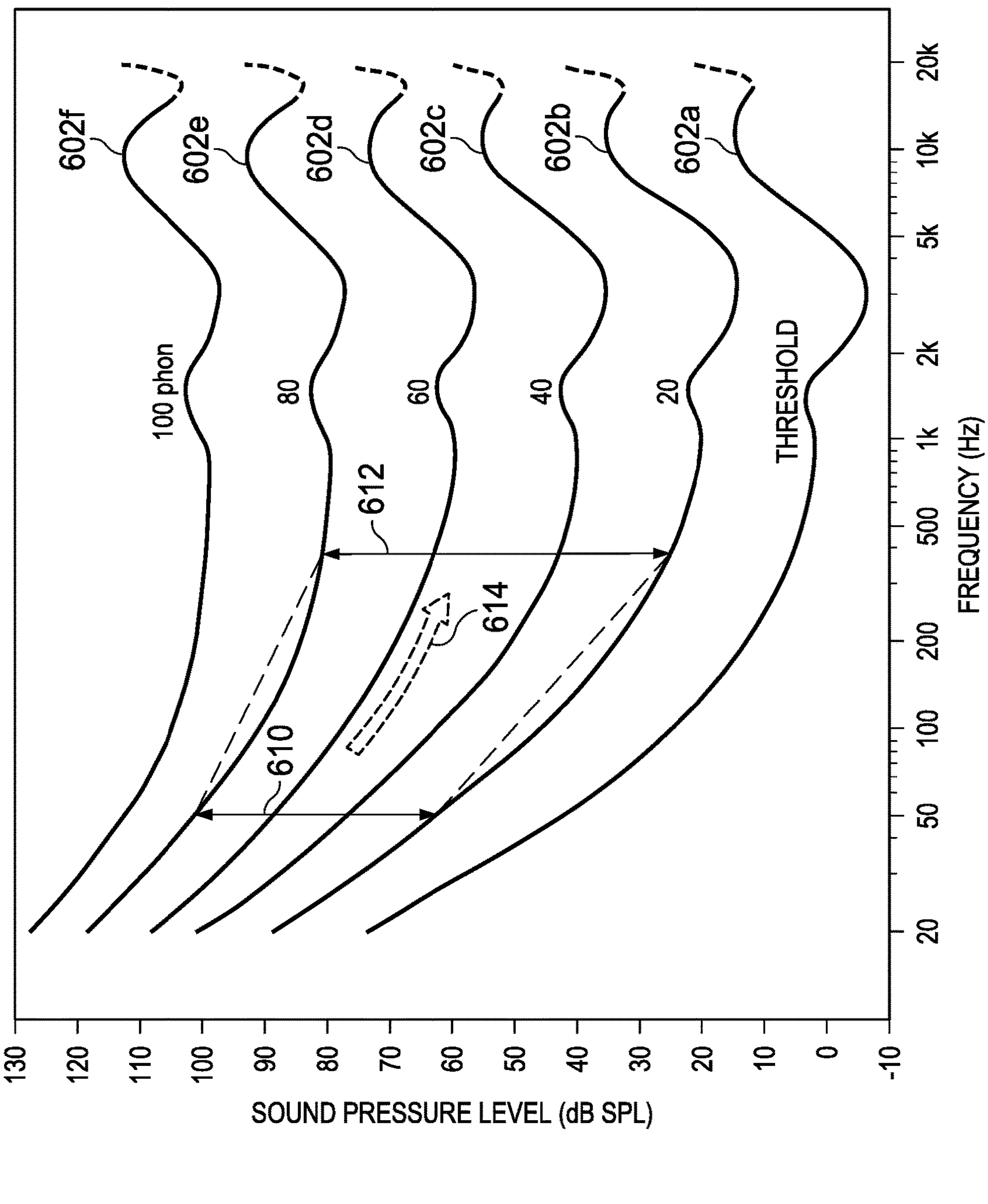
FIG. 6 is a graph 600 showing equal loudness curves.

FIG. 6 is a graph 600 showing equal loudness curves. In the graph 600, the x-axis is the frequency in Hz and the y-axis is the sound pressure level (SPL) in dB. The graph 600 includes 6 plots 602*a*, 602*b*, 602*c*, 602*d*, 602*e* and 602*f* (collectively, plots 602). Each of the plots 602 corresponds to a loudness level in phon, which is a logarithmic measurement of perceived sound magnitude. Each of the plots 602 may also be referred to as an equal loudness curve. The plot 602*a* corresponds to the perception threshold, the plot 602*b* corresponds to 20 phon, the plot 602*c* corresponds to 40 phon, the plot 602*d* corresponds to 60 phon, the plot 602*e* corresponds to 80 phon, and the plot 602*f* corresponds to 100 phon, When generating harmonics by the operation described by Equation (1), the dynamics are expanded by a ratio of n. Given this information, the equal loudness plots 602 suggest the relationship of Equation (2):

$$y_n = |x|^{\kappa(f,n)} \cdot e^{jn\varphi} \tag{2}$$

In Equation (2), the term κ(f, n) is a residue expansion ratio that is related to the fundamental frequency f and the order of the harmonics n. The residue expansion ratio κ(f, n) is typically in the range of 1.1-1.4 depending on the fundamental frequency f and the order of the harmonics n. When the harmonics are generated according to Equation (1), the desired expansion ratio κ(f, n) may be achieved by compression of the output from the harmonic generator by a factor κ(f, n)/n. (As an aside, the terms expansion and compression may be generally used as synonyms, with "compression" used when the ratio is less than 1 and "expansion" used when the ratio is greater than 1. So the factor κ(f, n)/n may be referred to as "compression" due to the divisor n.)

In the graph 600, the lines 610 and 612 illustrate an example of loudness expansion. The line 610 indicates a loudness range between 20 and 80 phon for a fundamental frequency of 50 Hz. The line 612 corresponds to generating a 50 Hz $4^{th}$ order harmonic of 400 Hz having the same loudness range. An arrow 614 from 610 to 612 indicates generating the 4th order harmonic. The dynamic SPL range of the fundamental frequency (line 610) is approximately 38 dB within the loudness range of 20 to 80 phon, and the dynamic SPL range of the $4^{th}$ order harmonic (line 612) is approximately 50 dB for the same loudness range. Hence, when generating a $4^{th}$ order harmonic from an 80 phon 50 Hz fundamental, the harmonic needs to be attenuated by approximately 20 dB. When the fundamental instead has a loudness of 20 phon, the harmonic needs to be attenuated by almost 40 dB, an increase in the needed attenuation by approximately 20 dB.

The SPL-to-phon expansion ratio, also referred to as the loudness expansion, may be approximated according to Equation (3):

$$R(f) = \frac{1}{0.121 \cdot \ln f + 0.169} \tag{3}$$

In Equation (3), R(f) is the SPL-to-phon expansion ratio, which has an inverse relation to the frequency f.

The residue expansion ratio κ(f, n), is given by Equation (4):

$$\kappa(f, n) = \frac{R(f)}{R(n \cdot f)} = 1 + \frac{\ln n}{\ln f + 1.397} \tag{4}$$

In Equation (4), the residue expansion ratio κ(f, n) corresponds to a ratio between the SPL-to-phon expansion ratio of the fundamental frequency f and the SPL-to-phon expansion ratio of the harmonic n·f, which corresponds to a ratio between the natural logarithm of n (the harmonic order) and a natural logarithm of f (the fundamental frequency). In other words, the residue expansion ratio κ(f, n) determines the factor needed when generating the $n^{th}$ harmonic from a fundamental frequency at f (in Hz). Equations (3) and (4)

have good agreement to the equal loudness curves of FIG. 6 in the range 20-80 phon and between 20 and 1000 Hz. When using the harmonics generator 400 (see FIG. 4) or the harmonics generator 500 (see FIG. 5), the dynamic compression needed can be performed with sufficient accuracy using one simple compressor having a constant ratio (e.g., as the compressor 408 or the compressor 504).

The compressor may apply the dynamic compression using a first-order averaging filter to avoid distortion due to per-sample normalization. The first-order averaging filter may process a control signal s, which may be calculated according to Equation (5):

$$s(m)=\alpha\cdot s(m-1)+(1-\alpha)\cdot c(m) \tag{5}$$

In Equation (5), m is the sample number, c is a compression gain, and a is a weight between the value of the control signal for the previous sample versus the value of the compression gain for the current sample. The weight a may also be referred to as an exponential smoothing factor, and corresponds to the pole in the first order low-pass system.

The weight a may be calculated using Equation (6):

$$\alpha=e^{-1}/(\tau f_s) \text{ and } \tau\approx 20e-3\ s \tag{6}$$

In Equation (6), $f_s$ is the sampling frequency and τ is a time constant.

The compression gain c may be calculated using Equation (7):

$$c(m)=\frac{b(0)+b(1)\cdot|x(m)|+b(2)\cdot|x(m)|^2+b(3)\cdot|x(m)|^4}{a(0)+a(1)\cdot|x(m)|+a(2)\cdot|x(m)|^2+a(3)\cdot|x(m)|^4} \tag{7}$$

In Equation (7), a and b are polynomial coefficients that are applied to each magnitude order of the sample m of the input signal x. Applying the compression gain c (or the smoothed version s of Equation (5)) to a signal x as c·x (or s·x) corresponds to a rational approximation of $\text{sign}(x)\cdot|x|^r$, which is the absolute value of signal x subject to a compression ratio r multiplied by the signum function of x.

Figure 7:
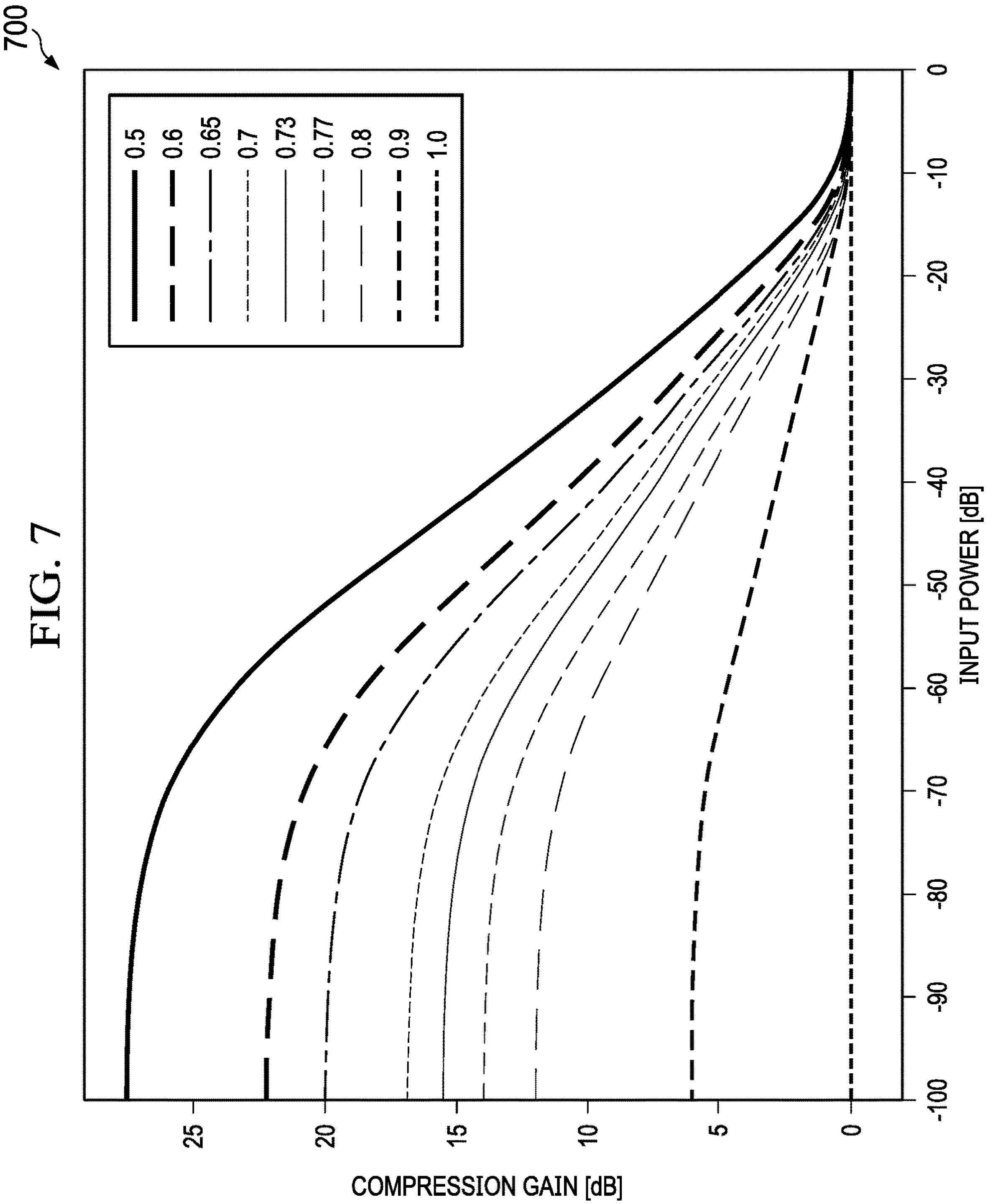
FIG. 7 is a graph 700 showing various compression gains c.

FIG. 7 is a graph 700 showing various compression gains c. In the graph 700, the x-axis is the input power (of the input signal x) in dB and the y-axis is the compression gain c in dB. Various curves are shown, each curve corresponding to a value for the compression ratio r. Specifically, 9 values for r in the range from 0.5 to 1.0 are given: 0.5, 0.6, 0.65, 0.7, 0.73, 0.77, 0.8, 0.9 and 1.0, with each value corresponding to one of the curves in the graph 700 (e.g., the value for r of 0.5 corresponds to the top curve). Note that the indicated gains of FIG. 7 are not exact; it is merely an illustration of the general concept. Also notable from the graph 700 is that the gain is limited for low input power and given by the ratio b(0)/a(0). This prevents excessive gain from being applied in circumstances such as transient onsets after quiet periods of the signal. (Instead this gain in combination with the time constant in Equation (6) allows more energy to pass through the compressor during e.g., percussive onsets, contributing to the perception of "punchiness" in the bass signal.)

Loudness Correction

An alternative approach to achieve loudness expansion is by applying normalization of the input signal in a first step, before the harmonic generation, followed by a gain adjustment stage. This is referred to as loudness correction.

Figure 8:
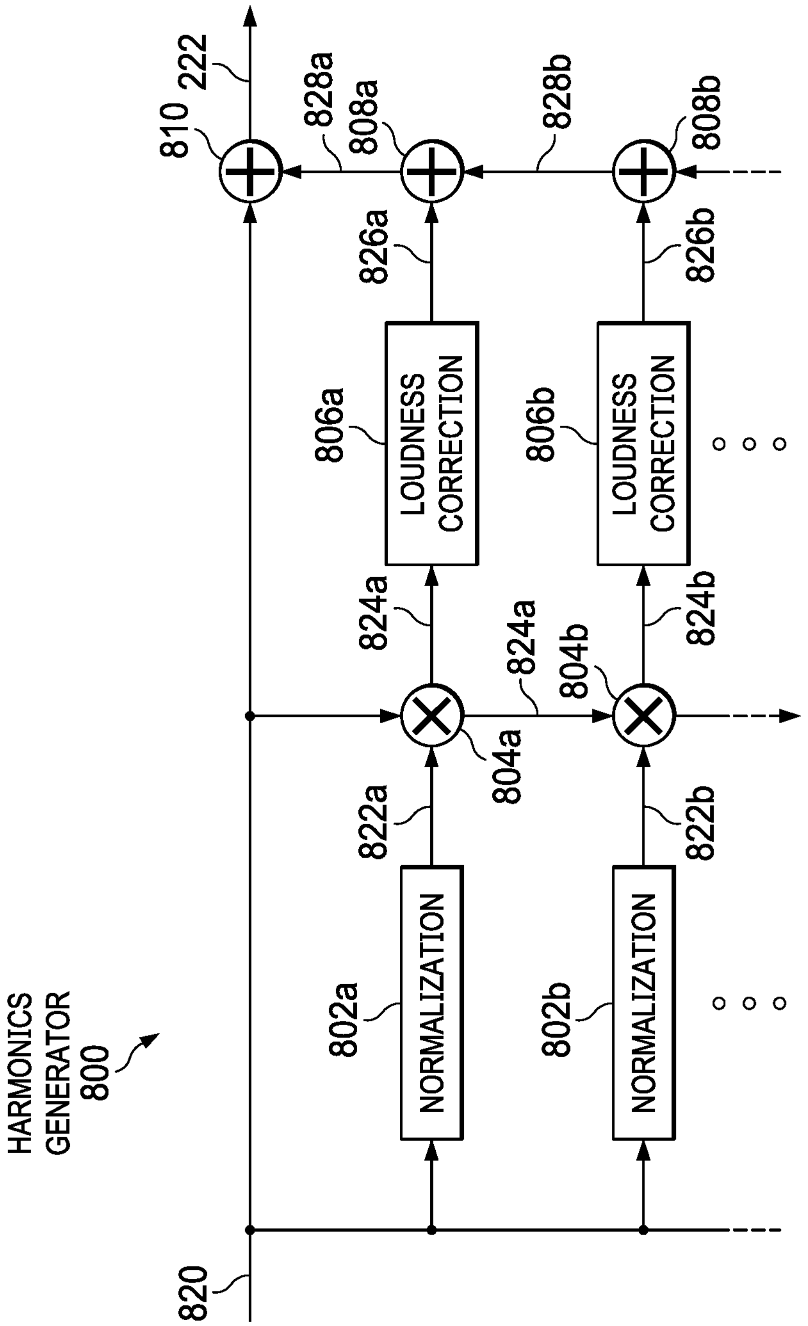
FIG. 8 is a block diagram of a harmonics generator 800.
Figure 9A:
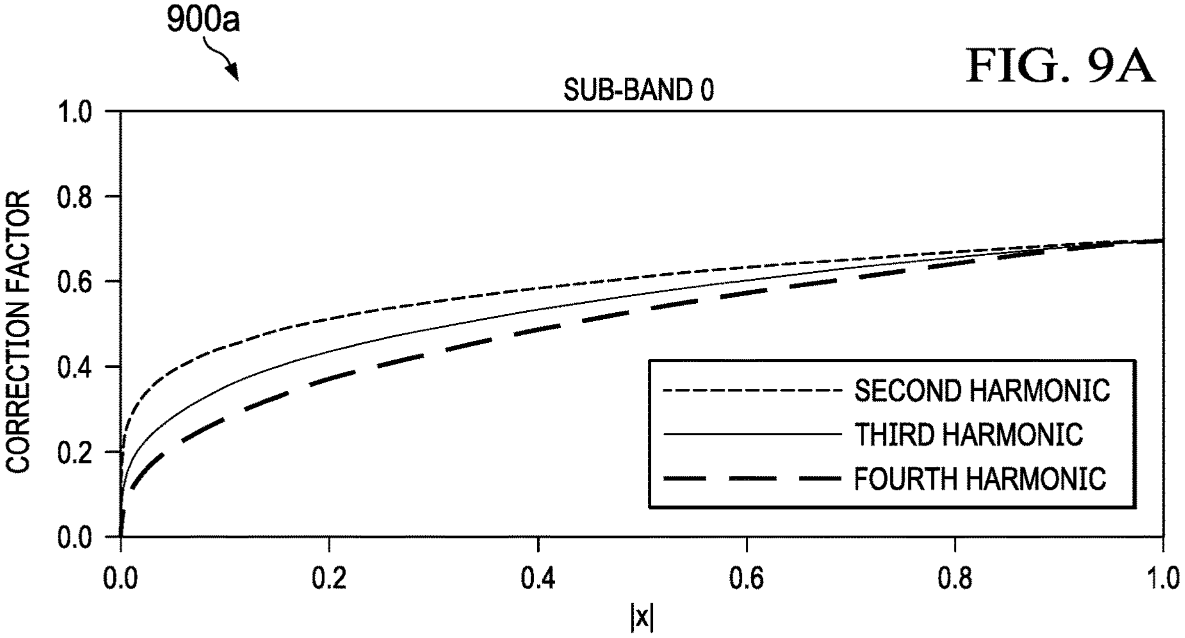
FIGS. 9A, 9B, 9C, 9D, 9E and 9F show a set of graphs 900*a*-900*f*.
Figure 9B:
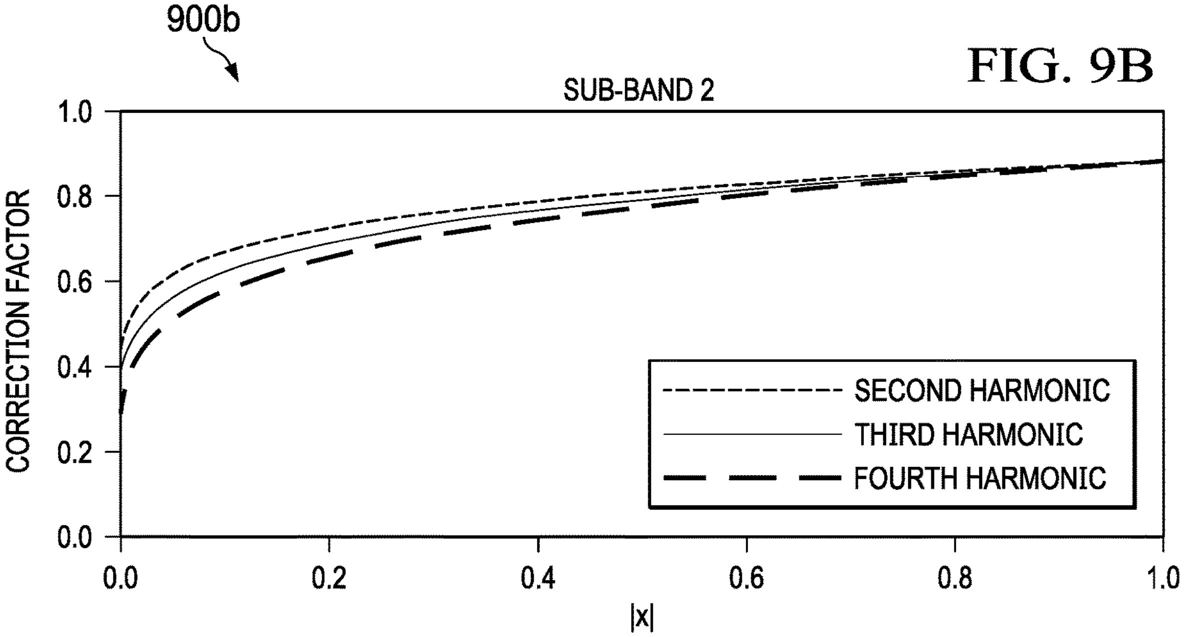
Figure 9C:
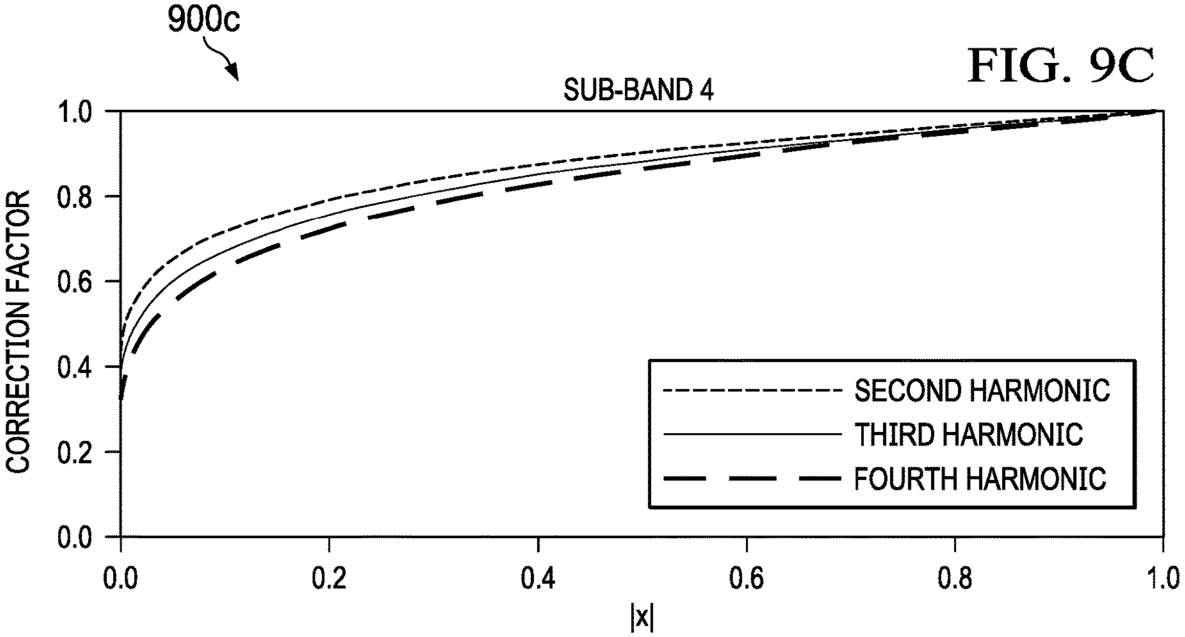
Figure 9D:
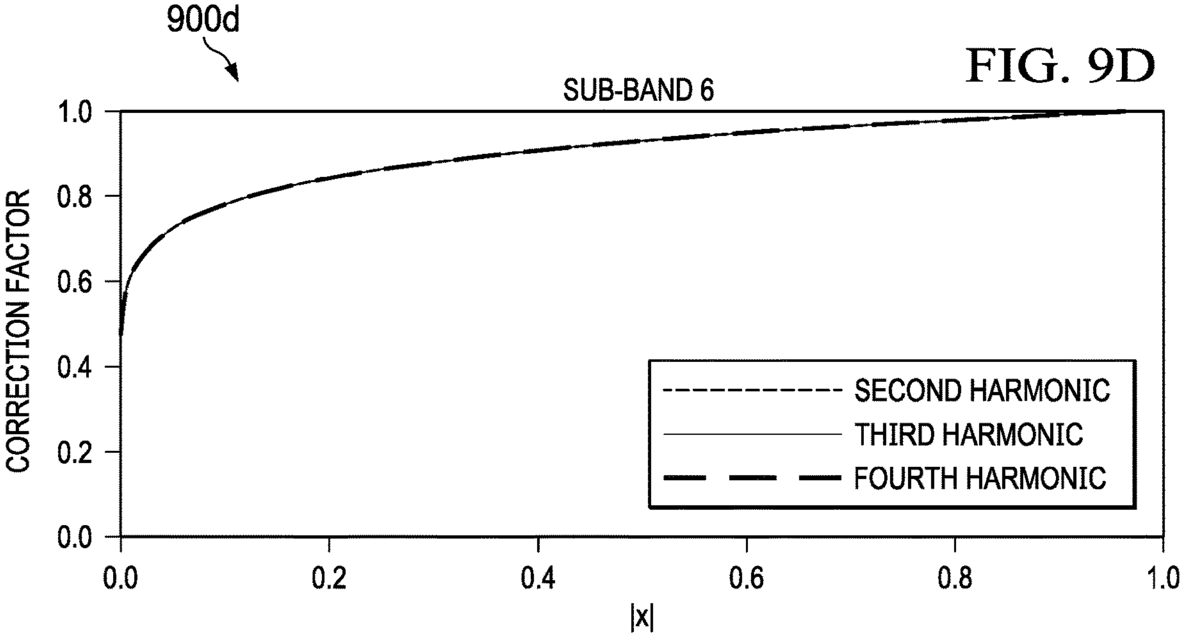
Figure 9E:
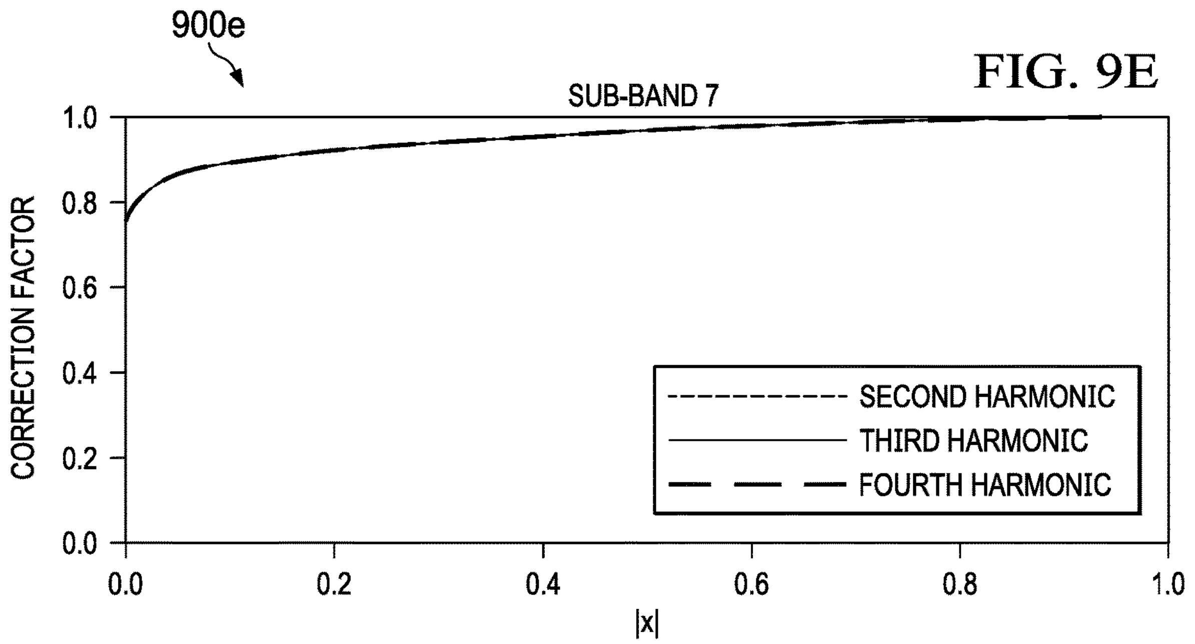
Figure 9F:
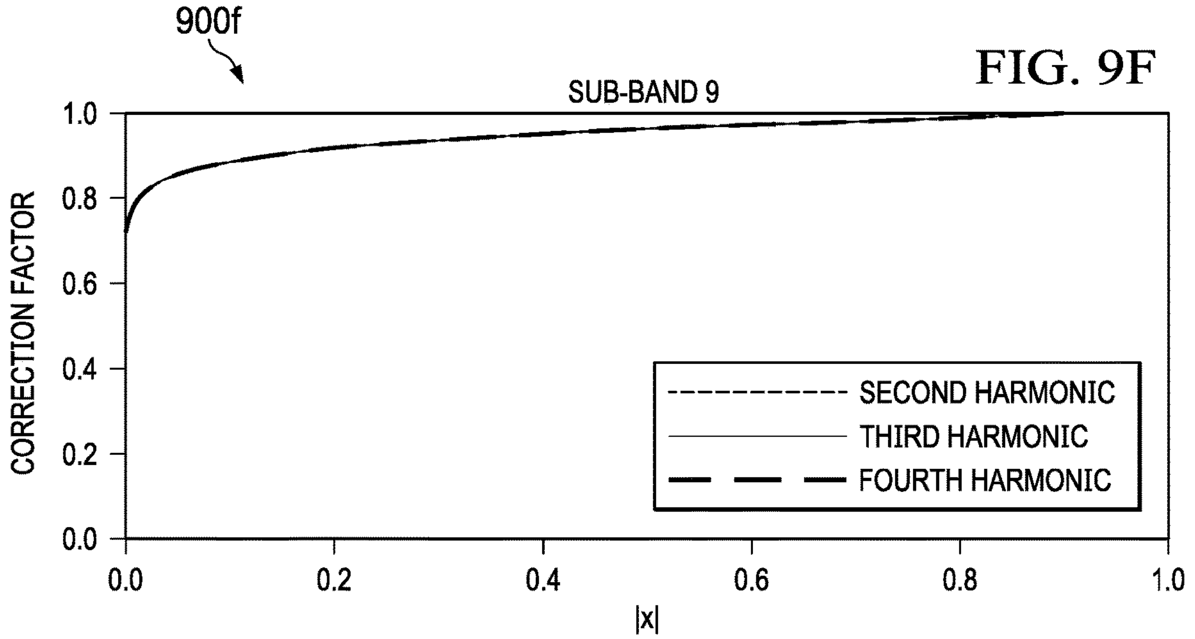

FIG. 8 is a block diagram of a harmonics generator 800. The harmonics generator 800 generally performs loudness correction using normalization of input signals. The amplitude normalization theoretically avoids the dynamic expansion of the harmonics (by the ratio n, as n≥2) when generated according to Equation (1).

The harmonics generator 800 includes two or more normalization stages 802 (two shown: 802*a* and 802*b*), two or more multipliers 804 (two shown: 804*a* and 804*b*), two or more loudness correction stages 806 (two shown: 806*a* and 806*b*), two or more adders 808 (two shown: 808*a* and 808*b*), and an adder 810. In general, each row of components in the harmonics generator 800 corresponds to one of the generated harmonics, so the number of rows (and the corresponding number of components) may be adjusted to implement the desired number of harmonics. The first processing row includes the normalization stage 802*a*, the multiplier 804*a*, the loudness correction stage 806*a*, and the adder 808*a*. The second processing row includes the normalization stage 802*b*, the multiplier 804*b*, the loudness correction stage 806*b*, and the adder 808*b*. Additional rows may be added to generate additional harmonics, with each new row connected to the previous row in a manner similar to what is shown in the figure.

The harmonics generator 800 receives an input signal 820. The input signal 820 corresponds to the upsampled signal 220 (see FIG. 2) when the upsampler 202 is present, or to the transformed audio signal 112 when the upsampler 202 is not present. The input signal 820 is a complex transform domain signal. For example, the input signal 820 may correspond to a HCQMF band (e.g., hybrid sub-band 0, hybrid sub-band 2, hybrid sub-band 4, hybrid sub-band 6, etc.). The harmonics generator 800 generates the signal 222 (see FIG. 2).

Starting with the normalization stages 802, the normalization stage 802*a* receives the input signal 820, performs normalization, and generates a signal 822*a*. The normalization stage 802*b* receives the input signal 820, performs normalization, and generates a signal 822*b*. Similarly to Equation (5), each of the normalization stages 802 may perform normalization using a first order smoothing filter to avoid distortion caused by sample-to-sample normalization. The normalization stages 802 may perform normalization in a manner described by Equation (8):

$$\hat{x}(m)=\alpha\cdot\hat{x}(m-1)+(1-\alpha)\cdot\bar{x}(m) \tag{8}$$

In Equation (8), $\hat{x}(m)$ is the current sample m of the normalized version of the input signal x, $\hat{x}(m-1)$ is the previous sample of the normalized version of the input signal, α is a smoothing factor, and $\bar{x}(m)$ is given by Equation (9):

$$\bar{x}(m)=\frac{x(m)}{|x(m)|} \tag{9}$$

In Equation (9), $\bar{x}(m)$ corresponds to the ratio between the complex value of the current sample of the input signal and the magnitude (also referred to as the absolute value) of the current sample of the input signal. The smoothing factor α may be adjusted as desired to control the desired smoothing time, and is dependent on the dynamics of the input signal. A smaller α is applied during attack events (e.g., when there is rapidly increasing signal energy) than under stationary or decreasing energy conditions, in order to avoid signal clipping.

Alternatively, the harmonics generator may use a single normalization stage (e.g., 802*a*), with the output signal (e.g., 822*a*) provided as an input to each of the multipliers 804.

Turning to the multipliers 804, the multiplier 804*a* receives the input signal 820 and the signal 822*a*, multiplies these signals together, and generates a signal 824*a*. The multiplier 804*b* receives the signal 822*b* and the signal 824*a*, multiplies these signals together, and generates a signal 824*b*. The signal 824*a* corresponds to the second harmonic, the signal 824*b* corresponds to the third harmonic, etc. Note that the output of a given multiplier is provided as an input to the multiplier in the subsequent processing row: The signal 824*a* is provided to the multiplier 804*b*, the signal 824*b* is provided to the multiplier in the subsequent row (shown with a dotted line), etc.

Turning to the loudness correction stages 806, the loudness correction stage 806*a* receives the signal 824*a*, performs loudness correction, and generates the signal 826*a*. The loudness correction stage 806*b* receives the signal 824*b*, performs loudness correction, and generates the signal 826*b*. In general, the loudness correction stages 806 apply dynamic expansion and attenuation of the normalized energy of the generated harmonics, in line with the equal loudness curves of FIG. 6, in order to maintain the loudness as compared to the fundamental. To adjust the loudness, a correction factor k is defined, where k is a function of the order of harmonic n, the smoothed magnitude of the fundamental $\hat{x}$ (see Equation (8)) and the hybrid band index b. This correction factor k is applied according to Equation (10):

$$\tilde{h}_n(m)=k(n,\hat{x},b)\cdot h_n(m) \tag{10}$$

In Equation (10), $\tilde{h}_n$ (m) is the loudness corrected harmonic and $h_n$(m) is the normalized harmonic, for each harmonic respectively.

As discussed above, the bass enhancement processes may be performed on one or more hybrid bands (e.g., one or more of sub-bands 0, 2, 4, 6, 7, 9, etc.). Several harmonics, e.g. $2^{nd}$, $3^{rd}$ and $4^{th}$, are generated in every band. If we let the center frequency approximate the fundamental frequency in each band, we may calculate the SPL-to-phon relationship using one parameter: the order or the harmonics n. As an example, the first hybrid band (e.g., sub-band 0) has a center frequency of 46.875 Hz (e.g., approximately 47 Hz) and the corresponding values from the ELC curves in FIG. 6 are listed in TABLE 1:

TABLE 1

| | frequency | 100 phon | 80 phon | 60 phon | 40 phon | 20 phon |
|---|---|---|---|---|---|---|
| Fundamental (dB SPL) | 47 Hz | 113 | 102 | 88 | 77 | 62 |
| 2nd order harmonic (dB SPL) | 94 Hz | 106 (−7) | 93 (−9) | 79 (−9) | 63 (−13) | 47 (−15) |
| 3rd order harmonic (dB SPL) | 141 Hz | 103 (−10) | 87 (−15) | 75 (−13) | 56 (−19) | 40 (−22) |
| 4th order harmonic (dB SPL) | 188 Hz | 102 (−11) | 86 (−16) | 70 (−18) | 52 (−23) | 35 (−27) |

In TABLE 1, the value between parenthesis is the SPL difference as compared to the fundamental. A function representing the SPL difference of a harmonic and its fundamental may be calculated according to Equation (11):

$$K_{b,n}=A_b+\beta_{b,n}X \tag{11}$$

In Equation (11), $K_{b,n}$ is a gain value in dB, $A_b$ is a minimum attenuation value, X is a smoothed input fundamental energy on a logarithmic scale, while $\beta_{b,n}$ is a harmonic order n dependent scaling parameter of the input energy. $\beta_{b,n}$ may be calculated according to Equation (12):

$$\beta_{b,n}=\varepsilon_b n+\eta_b \tag{12}$$

The correction factor on a linear scale may be calculated according to Equation (13):

$$k_{b,n}=10^{K_{b,n}/20}=10^{\frac{A_b}{20}}|x|^{\beta_{b,n}} \tag{13}$$

In Equations (12) and (13), $A_b$, $\varepsilon_b$ and $\eta_b$ are all hybrid band based constants and may be estimated for an optimal fit to the ELC curves of FIG. 6. The parameters listed in TABLE 2 will result in adequate accuracy for the first six hybrid bands and the resulting loudness correction factors are visualized in FIG. 9. For bands 6, 7 and 9, the generated harmonics are in the 700 to 2000 Hz frequency range, where the ELC curves are assumed to be flat. The loudness correction stages 806 may calculate the loudness correction factors using segmental linear approximation to save computational complexity.

TABLE 2

| Band index | $A_b$ | $\varepsilon_b$ | $\eta_b$ |
|---|---|---|---|
| 0 | −3 | 0.1 | 0 |
| 2 | −1 | 0.3125 | 0.0625 |
| 4 | 0 | 0.2941 | 0.0882 |
| 6 | 0 | 0 | 0.1111 |
| 7 | 0 | 0 | 0.0526 |
| 9 | 0 | 0 | 0.0526 |

FIGS. 9A, 9B, 9C, 9D, 9E and 9F show a set of graphs 900*a*-900*f*. In each graph, the x-axis is the magnitude of the normalized harmonic signal into the loudness correction stage (e.g., the signal 824*a* input into the loudness correction stage 806*a*, etc.) and the y-axis is the correction factor k. The graph 900*a* corresponds to hybrid band 0, the graph 900*b* corresponds to hybrid band 2, the graph 900*c* corresponds to hybrid band 4, the graph 900*d* corresponds to hybrid band 6, the graph 900*e* corresponds to hybrid band 7, and the graph 900*f* corresponds to hybrid band 9. The lines for three harmonics (the $2^{nd}$, $3^{rd}$ and $4^{th}$) are shown in each graph, but the lines are overlapping in the graphs 900*d*, 900*e* and 900*f* as the lines converge with the increasing hybrid band number. In general, the lines show the loudness correction factors k for the first 6 hybrid bands when using the hybrid band based constants listed in TABLE 2.

Returning to FIG. 8 and the adders 808, the adder 808*b* receives the signal 826*b* (and any signal received from the subsequent processing row, shown with a dotted line), performs addition, and generates a signal 828*b*. The adder 808*b* receives the signal 826*a* and the signal 828*b*, performs addition, and generates a signal 828*a*. Note that one of the inputs to a given adder is provided by the adder in the subsequent processing row: The adder 808*b* receives the output of the adder in the subsequent processing row (shown with a dotted line), the adder 808*a* receives the output of the adder 808*b*, etc.

The adder 810 receives the input signal 820 and the signal 828*a*, performs addition, and generates the signal 222 (see FIG. 2).

Multiple Hybrid Bands Processing

Although the description for the bass enhancement system 200 (see FIG. 2) focused on processing a single hybrid band, similar processing may be performed on multiple hybrid bands. For example, the bass enhancement system 120 (see FIG. 1) may be performed on four hybrid bands (e.g., sub-bands 0, 2, 4 and 6), six hybrid bands (e.g., sub-bands 0, 2, 4, 6, 7 and 9), etc. Several harmonics (e.g., $2^{nd}$, $3^{rd}$, $4^{th}$, etc.) are generated in every band.

Figure 10:
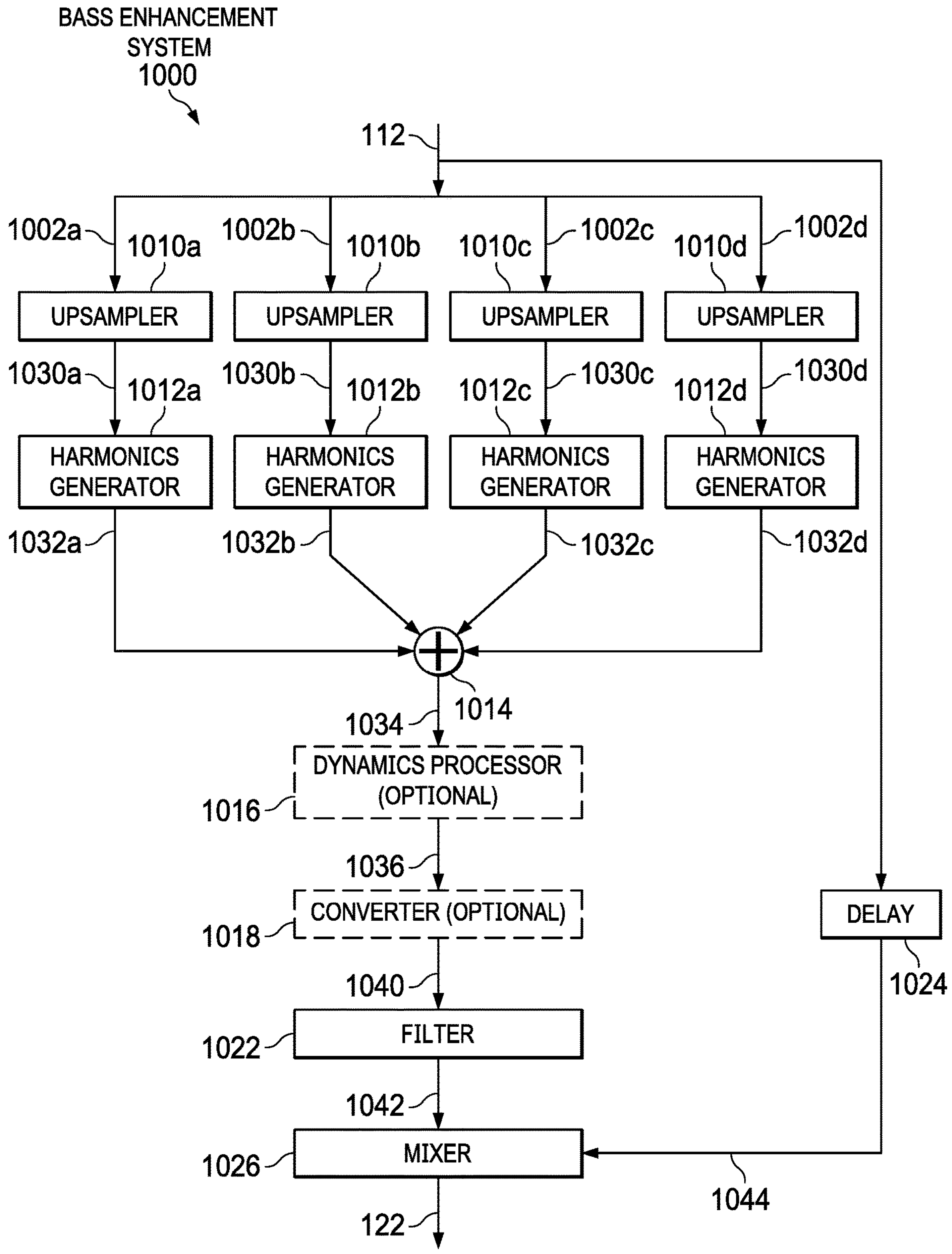
FIG. 10 is a block diagram of a bass enhancement system 1000.

FIG. 10 is a block diagram of a bass enhancement system 1000. The bass enhancement system 1000 may be used as the bass enhancement system 120 (see FIG. 1). The bass enhancement system 1000 is similar to the bass enhancement system 200 (see FIG. 2), with similar components having similar names and reference numerals, plus the addition of explicit multiple processing paths. Each processing path corresponds to processing a hybrid sub-band signal. As a specific example, four processing paths are shown (e.g., to process hybrid sub-bands 0, 2, 4 and 6). The number of processing paths may be increased or decreased as desired. For example, six processing paths may be used to process the hybrid sub-bands 0, 2, 4, 6, 7 and 9.

The bass enhancement system 1000 receives the transformed audio signal 112 (see FIG. 1). As discussed above, the transformed audio signal 112 is a hybrid complex transform domain signal with hybrid bands. Four of the hybrid bands of the transformed audio signal 112 are shown as the inputs to the bass enhancement system 1000: sub-band 0 (labeled 1002*a*), sub-band 2 (1002*b*), sub-band 4 (1002*c*) and sub-band 6 (1002*d*). Each sub-band corresponds to one of the processing paths. The bass enhancement system 1000 includes upsamplers 1010 (four shown: 1010*a*, 1010*b*, 1010*c* and 1010*d*), harmonics generators 1012 (four shown: 1012*a*, 1012*b*, 1012*c* and 1012*d*), an adder 1014, a dynamics processor 1016 (optional), a converter 1018 (optional), a filter 1022, a delay 1024, and a mixer 1026.

The upsampler 1010*a* receives the signal 1002*a*, performs upsampling, and generates an upsampled signal 1030*a*. The upsampler 1010*b* receives the signal 1002*b*, performs upsampling, and generates an upsampled signal 1030*b*. The upsampler 1010*c* receives the signal 1002*c*, performs upsampling, and generates an upsampled signal 1030*c*. The upsampler 1010*d* receives the signal 1002*d*, performs upsampling, and generates an upsampled signal 1030*d*. The signals 1030*a*, 1030*b*, 1030*c* and 1030*d* are complex transform domain signals. The upsamplers 1010 are otherwise similar to that described above regarding the upsampler 202 (see FIG. 2).

The harmonics generator 1012*a* receives the upsampled signal 1030*a* and generates harmonics thereof to result in a signal 1032*a*. The harmonics generator 1012*b* receives the upsampled signal 1030*b* and generates harmonics thereof to result in a signal 1032*b*. The harmonics generator 1012*c* receives the upsampled signal 1030*c* and generates harmonics thereof to result in a signal 1032*c*. The harmonics generator 1012*d* receives the upsampled signal 1030*d* and generates harmonics thereof to result in a signal 1032*d*. The signals 1032*a*, 1032*b*, 1032*c* and 1032*d* are complex transform domain signals. The harmonics generators 1012 are otherwise similar to the harmonics generator 204 (see FIG. 2). For example, one or more of the harmonics generators 1012 may be implemented using the harmonics generator 300 (see FIG. 3), the harmonics generator 400 (see FIG. 4), the harmonics generator 500 (see FIG. 5), the harmonics generator 800 (see FIG. 8), etc.

The adder 1014 receives the signals 1032*a*, 1032*b*, 1032*c* and 1032*d*, performs addition, and generates a signal 1034. The signal 1034 is a complex transform domain signal.

The dynamics processor 1016 receives the signal 1034, performs dynamics processing, and generates a signal 1036. The signal 1036 is a complex transform domain signal. The dynamics processor 1016 is otherwise similar to the dynamics processor 206 (see FIG. 2). The dynamics processor 1016 is optional. When the dynamics processor 1016 is omitted, the converter 1018 receives the signal 1034 instead of the signal 1036.

The converter 1018 receives the signal 1036 (or the signal 1034 when the dynamics processor 1016 is omitted), drops the imaginary part from the signal 1036, and generates a signal 1040. The signal 1040 is a transform domain signal. The converter 1018 is otherwise similar to the converter 208 (see FIG. 2), including being optional.

The filter 1022 receives the signal 1040 (or the signal 1036 when the converter 1018 is omitted, or the signal 1034 when the dynamics processor 1016 and the converter 1018 are omitted), performs filtering, and generates a signal 1042. The signal 1042 is a transform domain signal. The filter 1022 is otherwise similar to the filter 212 (see FIG. 2).

The delay 1024 receives the signal 1042, implements a delay period, and generates a signal 1044. The signal 1044 corresponds to a delayed version of the transformed audio signal 112 according to the delay period. The delay 1024 may be implemented using a memory, a shift register, etc. The delay period corresponds to the processing time of the other components in the signal processing chain; because some of these other components are optional, the delay period decreases when the optional components are omitted. The delay 1024 is otherwise similar to the delay 214 (see FIG. 2).

The mixer 1026 receives the signal 1042 and the signal 1044, performs mixing, and generates the enhanced audio signal 122 (see FIG. 1). The mixer 1026 is otherwise similar to the mixer 216 (see FIG. 2).

Figure 11:
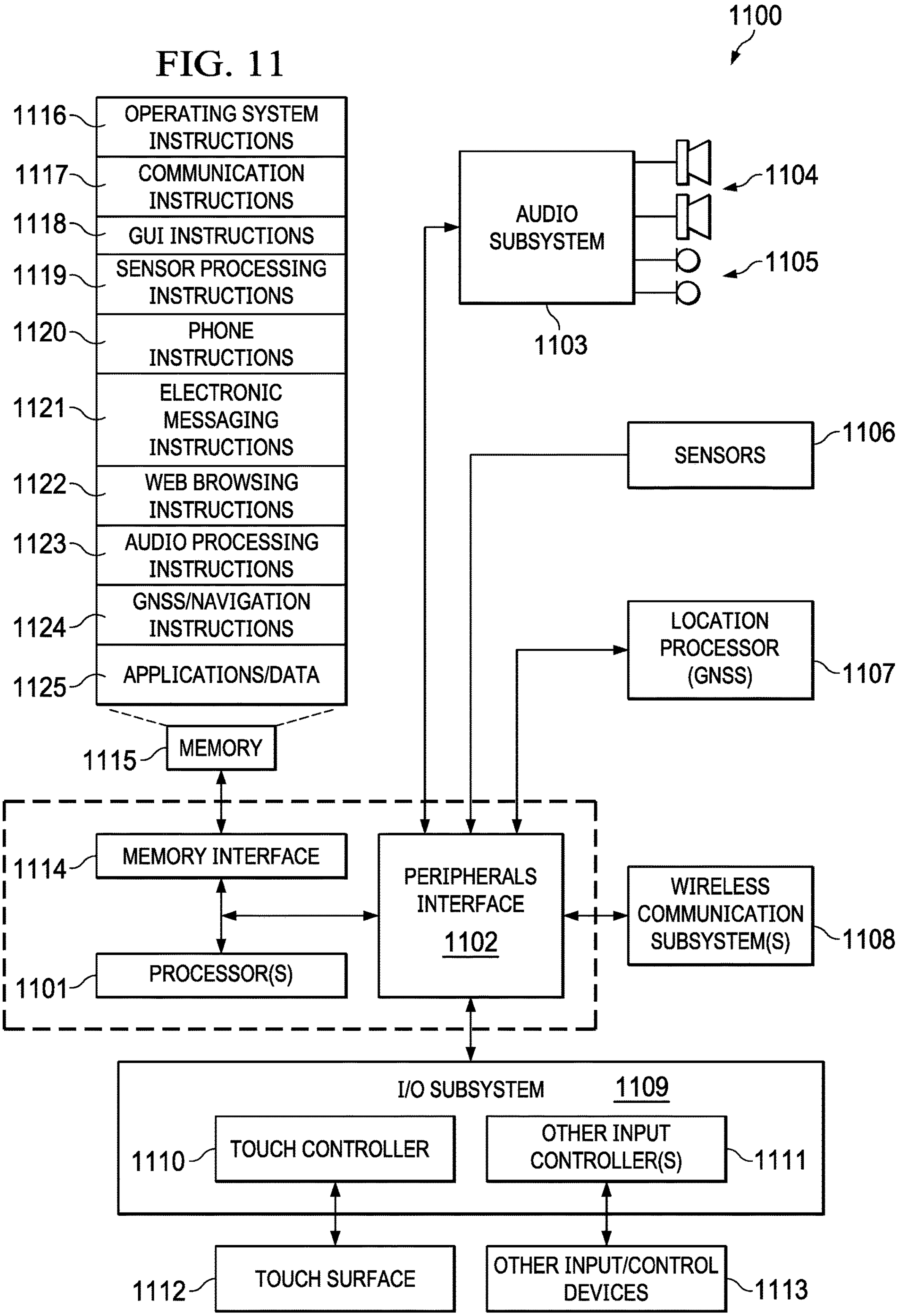
FIG. 11 is a mobile device architecture 1100 for implementing the features and processes described herein, according to an embodiment.

FIG. 11 is a mobile device architecture 1100 for implementing the features and processes described herein, according to an embodiment. The architecture 1100 may be implemented in any electronic device, including but not limited to: a desktop computer, consumer audio/visual (AV) equipment, radio broadcast equipment, mobile devices (e.g., smartphone, tablet computer, laptop computer, wearable device), etc. In the example embodiment shown, the architecture 1100 is for a laptop computer and includes processor(s) 1101, peripherals interface 1102, audio subsystem 1103, loudspeakers 1104, microphone 1105, sensors 1106 (e.g., accelerometers, gyros, barometer, magnetometer, camera), location processor 1107 (e.g., GNSS receiver), wireless communications subsystems 1108 (e.g., Wi-Fi, Bluetooth, cellular) and I/O subsystem(s) 1109, which includes touch controller 1110 and other input controllers 1111, touch surface 1112 and other input/control devices 1113. Other architectures with more or fewer components can also be used to implement the disclosed embodiments.

Memory interface 114 is coupled to processors 1101, peripherals interface 1102 and memory 1115 (e.g., flash, RAM, ROM). Memory 1115 stores computer program instructions and data, including but not limited to: operating system instructions 1116, communication instructions 1117, GUI instructions 1118, sensor processing instructions 1119, phone instructions 1120, electronic messaging instructions 1121, web browsing instructions 1122, audio processing instructions 1123, GNSS/navigation instructions 1124 and applications/data 1125. Audio processing instructions 1123 include instructions for performing the audio processing described herein.

Figure 12:
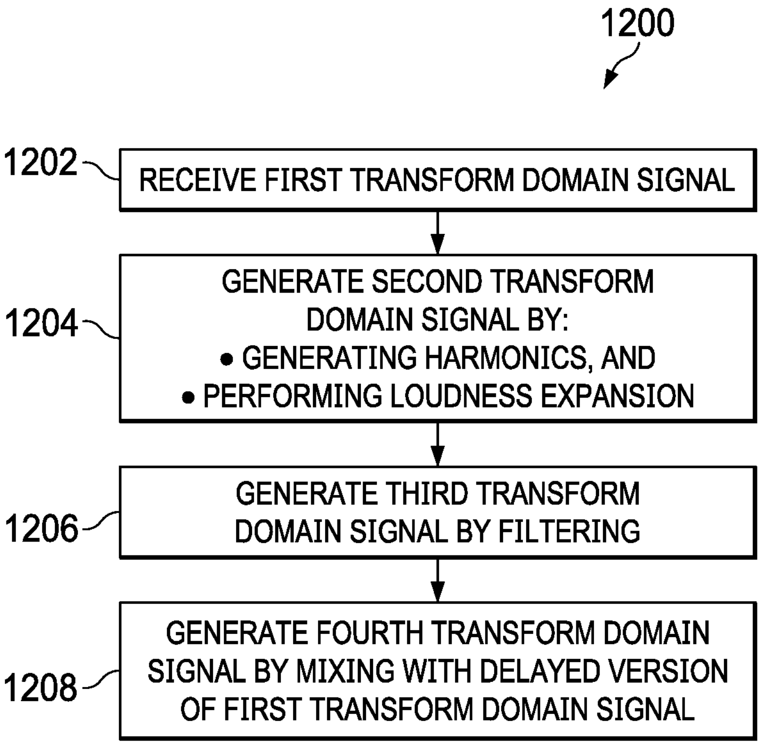
FIG. 12 is a flowchart of a method 1200 of audio processing.

FIG. 12 is a flowchart of a method 1200 of audio processing. The method 1200 may be performed by a device (e.g., a laptop computer, a mobile telephone, etc.) with the components of the architecture 1100 of FIG. 11, to implement the functionality of the audio processing system 100 (see FIG. 1), the bass enhancement system 200 (see FIG. 2), the bass enhancement system 1000 (see FIG. 10), etc., for example by executing one or more computer programs. In general, the method 1200 performs audio signal processing in a complex-valued sub-band domain (e.g., the HCQMF domain).

At 1202, a first transform domain signal is received. The first transform domain signal is a hybrid complex transform domain signal having a number of bands. At least one of the bands has a number of sub-bands. The first transform domain signal has a first plurality of harmonics. For example, the bass enhancement system 200 (see FIG. 2) may receive the transformed audio signal 112. The first transform domain signal may have 77 hybrid bands numbered 0-76, where bands 0-15 are sub-bands that result from splitting one or several larger bands. The first transform domain signal may be a CQMF domain signal. The first transform domain signal may be a HCQMF signal generated by splitting (e.g., by using Nyquist filter banks) a subset of the channels of a CQMF domain signal into sub-bands to increase the frequency resolution for the lowest frequency range.

At 1204, a second transform domain signal is generated based on the first transform domain signal. The second transform domain signal is generated by generating harmonics to of the first transform domain signal according to a non-linear process. The second transform domain signal has a second plurality of harmonics that differs from the first plurality of harmonics, and the second transform domain signal is a complex-valued signal having an imaginary part. The second transform domain signal is further generated by performing loudness expansion on the second plurality of harmonics. For example, the harmonics generator 204 (see FIG. 2), the harmonics generator 300 (see FIG. 3), the harmonics generator 400 (see FIG. 4), the harmonics generator 500 (see FIG. 5), the harmonics generator 800 (see FIG. 8), etc. may generate the second transform domain signal (e.g., the signal 222) based on the first transform domain signal (e.g., the signal 220, etc.).

At 1206, a third transform domain signal is generated by filtering the second transform domain signal. The third transform domain signal has a number of bands, and at least one of the bands has a number of sub-bands. For example, the filter 212 (see FIG. 2) may filter the signal 228 (or the signal 226) to generate the signal 230. As another example, the filter 1022 (see FIG. 10) may filter the signal 1040 to generate the signal 1042. The third transform domain signal may have 77 hybrid bands numbered 0-76, where bands 0-15 are sub-bands that result from splitting one or several larger bands. The third transform domain signal may be a HCQMF domain signal.

At 1208, a fourth transform domain signal is generated by mixing the third transform domain signal with a delayed version of the first transform domain signal. A given sub-band of the third transform domain signal is mixed with a corresponding sub-band of the delayed version of the first transform domain signal. For example, the mixer 216 (see FIG. 2) may mix the signal 230 with the delayed signal 232. As another example, the mixer 1026 (see FIG. 10) may mix the signal 1042 with the delayed signal 1044. The input signals may have 77 hybrid bands numbered 0-76, where a given band of one input signal (e.g., band 0) is mixed with the corresponding band of the other input signal (e.g., band 0).

The method 1200 may include additional steps corresponding to the other functionalities of the bass enhancement system 200, the bass enhancement system 1000, etc. as described herein. For example, the fourth transform domain signal may be outputted by a loudspeaker, such as the loudspeakers 1104 (see FIG. 11). As another example, the transform domain signals may be upsampled (e.g., using the upsampler 202, the upsamplers 1010) prior to generating the harmonics at 1204. As another example, dynamics processing may be applied to the transform domain signals, e.g. using the dynamics processor 206 or the dynamics processor 1016. As another example, generating the harmonics may include performing multiplication, using a feedback delay loop, etc. As another example, the second transform domain signal may be a number of second transform domain signals, each of which corresponds to a hybrid band of the first transform domain signal. As another example, the imaginary part of the second transform domain signal may be dropped prior to generating the third transform domain signal.

Implementation Details

An embodiment may be implemented in hardware, executable modules stored on a computer readable medium, or a combination of both (e.g., programmable logic arrays). Unless otherwise specified, the steps executed by embodiments need not inherently be related to any particular computer or other apparatus, although they may be in certain embodiments. In particular, various general-purpose machines may be used with programs written in accordance with the teachings herein, or it may be more convenient to construct more specialized apparatus (e.g., integrated circuits) to perform the required method steps. Thus, embodiments may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion.

Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein. (Software per se and intangible or transitory signals are excluded to the extent that they are unpatentable subject matter.)

Aspects of the systems described herein may be implemented in an appropriate computer-based sound processing network environment for processing digital or digitized audio files. Portions of the adaptive audio system may include one or more networks that comprise any desired number of individual machines, including one or more routers (not shown) that serve to buffer and route the data transmitted among the computers. Such a network may be built on various different network protocols, and may be the Internet, a Wide Area Network (WAN), a Local Area Network (LAN), or any combination thereof.

One or more of the components, blocks, processes or other functional components may be implemented through a computer program that controls execution of a processor-based computing device of the system. It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, physical (non-transitory), non-volatile storage media in various forms, such as optical, magnetic or semiconductor storage media.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents will be evident to those skilled in the art and may be employed without departing from the spirit and scope of the disclosure as defined by the claims.

What is claimed is:

1. A computer-implemented method of audio processing, the method comprising:

receiving a first transform domain signal, wherein the first transform domain signal is a hybrid complex transform domain signal having a plurality of bands, wherein at least one of the plurality of bands has a plurality of sub-bands, wherein the first transform domain signal has a first plurality of harmonics;

generating an upsampled first transform domain signal by upsampling the first transform domain signal, wherein the upsampled signal is a complex-valued time domain signal;

generating a second transform domain signal based on the upsampled first transform domain signal by:

generating a second plurality of harmonics to the upsampled first transform domain signal according to a non-linear process, wherein the second transform domain signal has the second plurality of harmonics that differs from the first plurality of harmonics; and performing loudness expansion on the second plurality of harmonics, wherein the second transform domain signal is a complex-valued signal having an imaginary part;

filtering the second transform domain signal to split the second transform domain signal into a plurality of sub-bands and generate a third transform domain signal, wherein the third transform domain signal has a plurality of bands, wherein at least one of the plurality of bands has the plurality of sub-bands; and generating a fourth transform domain signal by mixing the third transform domain signal with a delayed version of the first transform domain signal, wherein a given sub-band of the third transform domain signal is mixed with a corresponding sub-band of the delayed version of the first transform domain signal.

2. The method of claim 1, wherein the second plurality of harmonics result in the fourth transform domain signal having perceptually enhanced bass as compared to the first transform domain signal.

3. The method of claim 1, wherein generating the upsampled first transform domain signal is performed according to complex quadrature mirror filtering synthesis.

4. The method of claim 1, further comprising:

performing dynamics processing on the second transform domain signal, prior to generating the third transform domain signal from the second transform domain signal.

5. The method of claim 1, wherein the plurality of bands of the first transform domain signal has a first band, a second band and a third band, wherein the first band is split into 8 sub-bands, wherein the second band is split into 4 sub-bands, and wherein the third band is split into 4 sub-bands.

6. The method of claim 1, wherein the first transform domain signal has 64 bands, wherein a first band is split into 8 sub-bands, wherein a second band is split into 4 sub-bands, and wherein a third band is split into 4 sub-bands.

7. The method of claim 1, wherein the first transform domain signal has a bandwidth of 24 kHz, wherein the first transform domain signal has 64 bands, and wherein a passband bandwidth of each band is 375 Hz.

8. The method of claim 1, wherein the non-linear process includes multiplication of the first transform domain signal.

9. The method of claim 1, wherein the non-linear process includes a feedback delay loop applied to the first transform domain signal.

10. The method of claim 1, wherein generating the second transform domain signal comprises:

generating the second transform domain signal based on one of the plurality of sub-bands of the first transform domain signal, wherein the one of the plurality of sub-bands is less than all of the plurality of sub-bands of the first transform domain signal.

11. The method of claim 1, wherein generating the second transform domain signal comprises:

generating a plurality of second transform domain signals based on two or more of the plurality of sub-bands of the first transform domain signal, wherein the two or more of the plurality of sub-bands are less than all of the plurality of sub-bands of the first transform domain signal, and wherein each of the plurality of second transform domain signals corresponds to one of the two or more of the plurality of sub-bands; and generating the second transform domain signal by summing the plurality of second transform domain signals.

12. The method of claim 1, further comprising:

outputting, by a loudspeaker, sound corresponding to the fourth transform domain signal.

13. The method of claim 1, wherein the first transform domain signal is in a first signal domain, the method further comprising:

receiving an input signal in a second signal domain;

generating the first transform domain signal by converting the input signal from the second signal domain to the first signal domain; and generating an output signal by converting the fourth transform domain signal from the first signal domain to the second signal domain.

14. The method of claim 13, wherein the second transform domain is a time domain, wherein the first signal domain is a hybrid complex quadrature mirror filter (HCQMF) signal domain;

wherein generating the first transform domain signal comprises generating the first transform domain signal by performing HCQMF analysis on the input signal; and wherein generating the output signal comprises generating the output signal by performing HCQMF synthesis on the fourth transform domain signal.

15. The method of claim 1, further comprising:

dropping the imaginary part from the second transform domain signal, prior to generating the third transform domain signal.

16. A non-transitory computer readable medium storing a computer program that, when executed by a processor, controls an apparatus to execute processing including the method of claim 1.

17. An apparatus for audio processing, the apparatus comprising:

a processor, wherein the processor is configured to control the apparatus to receive a first transform domain signal, wherein the first transform domain signal is a hybrid complex transform domain signal having a plurality of complex values and a plurality of bands, wherein at least one of the plurality of bands has a plurality of sub-bands, wherein the first transform domain signal has a first plurality of harmonics;

wherein the processor is configured to control the apparatus to generate an upsampled first transform domain signal by upsampling the first transform domain signal, wherein the upsampled signal is a complex-valued time domain signal; and generate a second transform domain signal based on the upsampled first transform domain signal by:

generating a second plurality of harmonics to the upsampled first transform domain signal according to a non-linear process, wherein the second transform domain signal has the second plurality of harmonics that differs from the first plurality of harmonics; and performing loudness expansion on the second plurality of harmonics, wherein the second transform domain signal is a complex-valued signal having an imaginary part;

wherein the processor is configured to control the apparatus to filter the second transform domain signal to split the second transform domain signal in to a plurality of sub-bands and generate a third transform domain signal, wherein the third transform domain signal has a plurality of bands, wherein at least one of the plurality of bands has a plurality of sub-bands;

wherein the processor is configured to control the apparatus to generate a fourth transform domain signal by mixing the third transform domain signal with a delayed version of the first transform domain signal, wherein a given sub-band of the third transform domain signal is mixed with a corresponding sub-band of the delayed version of the first transform domain signal.

18. The apparatus of claim 17, further comprising:

a loudspeaker that is configured to output the fourth transform domain signal as sound.

* * * * *